US012696254B2

(12) United States Patent
Hu et al.

(10) Patent No.: US 12,696,254 B2
(45) Date of Patent: Jul. 28, 2026

(54) COMMUNICATION METHOD AND COMMUNICATION APPARATUS

(71) Applicant: Huawei Technologies Co., Ltd., Shenzhen (CN)

(72) Inventors: Zijia Hu, Chengdu (CN); Longxin Liu, Shenzhen (CN); Xiaobin Jiang, Shanghai (CN); Wei Wen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 323 days.

(21) Appl. No.: 18/587,262

(22) Filed: Feb. 26, 2024

(65) Prior Publication Data

US 2024/0205900 A1      Jun. 20, 2024

Related U.S. Application Data

(63) Continuation of application No. PCT/CN2022/103257, filed on Jul. 1, 2022.

(30) Foreign Application Priority Data

Aug. 27, 2021    (CN) .......................... 202110994815.6

(51) Int. Cl.
*H04W 72/0453*       (2023.01)
*H04L 5/00*       (2006.01)
*H04W 36/08*       (2009.01)

(52) U.S. Cl.
CPC ....... *H04W 72/0453* (2013.01); *H04L 5/0035* (2013.01); *H04W 36/08* (2013.01)

(58) Field of Classification Search
CPC .. H04L 5/0035; H04W 36/08; H04W 72/0453
See application file for complete search history.

(56) References Cited

U.S. PATENT DOCUMENTS

| | | | |
|---|---|---|---|
| 11,219,011 B1 * | 1/2022 | Mansour | ............... H04L 5/0053 |
| 2007/0263576 A1 | 11/2007 | Deguchi | |
| 2010/0329168 A1 | 12/2010 | Wu et al. | |

FOREIGN PATENT DOCUMENTS

| | | |
|---|---|---|
| CN | 109218998 A | 1/2019 |
| CN | 109587705 A | 4/2019 |
| KR | 20140022033 A | 2/2014 |
| KR | 20150088748 A | 8/2015 |
| KR | 101849507 B1 | 4/2018 |

* cited by examiner

*Primary Examiner* — Gbemileke J Onamuti
(74) *Attorney, Agent, or Firm* — Slater Matsil, LLP

(57) ABSTRACT

Embodiments of this application disclose a communication method and a communication apparatus, to establish two intra-frequency co-coverage cells within a same frequency band, and arrange time-frequency resources respectively used by the two cells in a time division or frequency division manner to avoid co-channel interference, so that the two cells back up each other. When one cell of the cells is abnormal, the other cell can still provide a service for a terminal device. Because the two cells share the frequency band, spectrum resources can be reduced, and consumption of the time-frequency resources can be reduced. In addition, radio resource utilization can be improved while a reliability gain of dual-network system-level backup is obtained.

20 Claims, 16 Drawing Sheets

Resources of a first PUCCH and a second PUCCH

Resources shared by a first PUSCH and a second PUSCH

Resource of a first PRACH

Resource of a second PRACH

Resource of a first SRS

Resource of a second SRS

COMMUNICATION METHOD AND COMMUNICATION APPARATUS

CROSS-REFERENCE TO RELATED APPLICATIONS

This application is a continuation of International Application No. PCT/CN2022/103257, filed on Jul. 1, 2022, which claims priority to Chinese Patent Application No. 202110994815.6, filed on Aug. 27, 2021. The disclosures of the aforementioned applications are hereby incorporated by reference in their entireties.

TECHNICAL FIELD

Embodiments of this application relate to the communication field, and in particular, to a communication method and a communication apparatus.

BACKGROUND

Network reliability is an important attribute of a wireless communication network, and usually refers to tolerance for a service of a user to a network error. When the network is abnormal, if the service of the user is not interrupted, or the service of the user can be recovered quickly when an interrupt is generated, it indicates that reliability of the network is high. Currently, with development of communication technologies, many services require that the services be continuously uninterrupted during the network error, or require that interruption time that can be tolerated be very short. Therefore, the network needs to have a quick recovery capability when a fault occurs.

In a conventional technology, redundancy design is usually used to improve network reliability. For example, an inter-frequency dual-network active-active system-level redundancy manner is used. Specifically, a terminal device needs to be connected to two inter-frequency cells from different network devices, and time-frequency resources of the two inter-frequency cells are distributed as staggered as possible in time domain and frequency domain. When the network device corresponding to either of the two cells is abnormal, the terminal device can maintain, by using the other cell, a connection to the network device corresponding to the cell, to maintain a service of the terminal device uninterrupted.

However, because the two inter-frequency cells occupy different bandwidths, two bandwidths, namely, the bandwidths of the two cells located in different frequency bands, need to be occupied in a communication process. Consequently, spectrum resources are wasted.

SUMMARY

Embodiments of this application provide a communication method and a communication apparatus, to improve radio resource utilization while obtaining a reliability gain of dual-network system-level backup.

According to a first aspect, this application provides a communication method. In the method, a network device establishes a first cell. In this case, a second cell further exists in a network, where the second cell and the first cell are intra-frequency co-coverage cells, and a first channel resource of the first cell and a second channel resource of the second cell are arranged within a frequency range of intra-frequency between the first cell and the second cell in a time division or frequency division manner. In this case, after obtaining information about the channel resource of the first cell (or information about the channel resource of the second cell), the network device may determine information about the channel resource of the second cell (or information about the channel resource of the first cell). Then, the network device may communicate with a terminal device based on the information about the channel resource of the first cell and the information about the channel resource of the second cell.

The first cell and the second cell are the intra-frequency co-coverage cells of each other, the first channel resource and the second channel resource of the second cell are arranged within a first frequency domain range in the time division or frequency division manner, and the first frequency domain range is a frequency domain range in which a frequency domain resource of the first cell overlaps a frequency domain resource of the second cell. The information about the first channel resource indicates a time-frequency domain position of one or more channels of the first cell. The information about the second channel resource indicates a position of a time-frequency resource of one or more channels of the second cell.

It should be understood that co-coverage means that coverage of the first cell and coverage of the second cell are the same or nearly overlap in space or on the ground, so that when the terminal device searches for a nearby cell, if the terminal device can find the first cell, there is a high probability that the terminal device can also find the second cell. Optionally, when there is no other cell near the first cell and the second cell, the coverage of the first cell may partially overlap the coverage of the second cell. In this implementation, alternatively, when the terminal device searches for a nearby cell, if the terminal device can find the first cell, there is a high probability that the terminal device can also find the second cell.

It should be understood that intra-frequency means that a frequency band of the first cell in a frequency range (that is, a system bandwidth of the first cell) is the same as a frequency band of the second cell in a frequency range (that is, a system bandwidth of the second cell), or a frequency band of the first cell in a frequency range partially overlaps a frequency band of the second cell in a frequency range. The first frequency domain range is the frequency domain range in which the frequency domain resource of the first cell overlaps the frequency domain resource of the second cell. Optionally, if the frequency domain resource of the first cell is completely the same as the frequency domain resource of the second cell, each of a range of the frequency domain resource of the first cell and a range of the frequency domain resource of the second cell is equal to the first frequency domain range. Optionally, if the frequency domain resource of the first cell partially overlaps the frequency domain resource of the second cell, the first frequency domain range is an intersection of a frequency domain range of the first cell and a frequency domain range of the second cell.

It should be understood that, that the network device communicates with a terminal device based on the information about the channel resource of the first cell and the information about the channel resource of the second cell may be understood as that the network device communicates with the terminal device by using one of the first cell and the second cell, or may be understood as that the network device communicates with the terminal device by separately using the first cell and the second cell.

In this embodiment, the two intra-frequency co-coverage cells are established within the same frequency band, and time-frequency resources respectively used by the two cells are arranged in the time division or frequency division manner to avoid co-channel interference, so that the two cells back up each other. When one cell of the cells is abnormal, the other cell can still provide a service for the terminal device. Because the two cells share the frequency band, spectrum resources can be reduced, and consumption of bandwidth resources can be reduced. In addition, radio resource utilization can be improved while a reliability gain of dual-network system-level backup is obtained.

In a possible implementation, the first cell and the second cell each belong to a different network device. For ease of description, the first cell is referred to as a cell of a first network device, and the second cell is referred to as a cell of a second network device. The network device that communicates with the terminal device is the first network device.

In this implementation, because the first cell and the second cell belong to the different network devices, it indicates that hardware (for example, a first baseband processing unit (Building Base Band Unit, BBU)) for establishing the first cell is different from hardware (for example, a second BBU) for establishing the second cell. In comparison with the two intra-frequency cells established under the same network device, this has a stronger disaster tolerance capability. For example, when the first cell is abnormal due to a hardware fault of the first cell, because the first cell and the second cell belong to the different network devices, the second cell is not affected due to an error in the first cell. If both the first cell and the second cell belong to the same network device, the first cell is abnormal due to a hardware fault of the network device, and the second cell also has a risk of a fault.

In a possible implementation, the first cell and the second cell use a same standard. For example, both the first cell and the second cell are cells of a 5th generation (5G) mobile communication technology or new radio (NR) technology standard. Alternatively, both the first cell and the second cell use subsequent evolved standards (for example, the 6th generation mobile information technology (6G)).

In another possible implementation, the first cell and the second cell use different standards. For example, one of the first cell and the second cell is a cell of a long term evolution (LTE) standard, and the other cell of the first cell and the second cell is a cell of a 5G or NR standard. For another example, one of the first cell and the second cell is a cell of an LTE standard, and the other cell of the first cell and the second cell is a cell of a 6G standard or a subsequent evolved standard. For another example, one of the first cell and the second cell is a cell of a 5G or NR standard, and the other cell of the first cell and the second cell is a cell of a 6G standard or a subsequent evolved standard.

In a possible implementation, the first cell and/or the second cell maintain/maintains a radio resource control (RRC) connection to the terminal device. In this embodiment, the terminal device may have the RRC connection to either of the two cells, or may have the RRC connection to both the first cell and the second cell. Specifically, if the terminal device has the RRC connection to both the two cells, when one of the cells is faulty, the connection between the other cell and the terminal device is not interrupted. Therefore, a service of the terminal device is not interrupted. If the terminal device has the RRC connection to either of the two cells, when the cell connected to the terminal device is faulty, the terminal device can quickly reselect the other cell of the two cells. Therefore, the service of the terminal device is almost not interrupted or is interrupted only for short time.

In a possible implementation, a process in which the network device obtains the information about the first channel resource of the first cell served by the network device may be implemented in any one of the following manners.

Manner 1: The information about the first channel resource is directly configured in the network device by operations and maintenance personnel. In this case, the network device may directly obtain the information about the first channel resource from a storage apparatus in the network device. Optionally, because the first channel resource of the first cell and the second channel resource of the second cell are arranged within the first frequency domain range in the time division or frequency division manner, the network device may determine the information about the second channel resource based on a channel of the first channel resource. In this implementation, the first channel resource of the first cell and the second channel resource of the second cell are configured by the operations and maintenance personnel, and the network device does not need to obtain, from the other network device, the information about the channel resource that is of the cell and that is located in the other network device. This helps reduce implementation complexity of the network device, and ensure efficiency of constructing the first cell by the network device.

Manner 2: The information about the first channel resource and the information about the second channel resource are pre-agreed (for example, written into a protocol), and the network device knows that there are the channel resources of the two cells within the first frequency domain range, but the network device does not know which channel resource of the cell should be used by the network device. In this case, the network device (namely, the first network device) may obtain, through an interface with another network device (namely, the second network device), the information about the channel resource (namely, the information about the second channel resource) used by the second cell in the second network device, and then infer the information about the first channel resource based on the information about the second channel resource. In this implementation, it is not specified whether the first cell uses an upper half part of the first frequency domain range or a lower half part of the first frequency domain range. In this case, the first cell and the second cell may flexibly schedule the time-frequency resources within the first frequency domain range, so that utilization of the time-frequency resources is improved.

In a possible implementation, the first frequency domain range includes a second frequency domain range, the second frequency domain range is near a center frequency of the first frequency domain range, and the second frequency domain range is less than or equal to the first frequency domain range. A first data channel resource of the first cell and a second data channel resource of the second cell are arranged within the second frequency domain range in the time division or frequency division manner.

In this implementation, it is proposed that the channel resource used by the cell includes the data channel resource, and both the first data channel resource of the first cell and the second data channel resource of the second cell are arranged in a middle part of the system bandwidth, that is, near the center frequency of the first frequency domain range.

In a possible implementation, the method further includes: The network device obtains service information of the first cell and service information of the second cell. The network device determines, based on the service information of the first cell and the service information of the second cell, a quantity of resources occupied by the first data channel resource in frequency domain or a quantity of time domain units occupied by the first data channel resource in time domain. The service information includes service-related information such as a traffic volume and a service priority.

It should be understood that when the first data channel resource and the second data channel resource are arranged within the second frequency domain range in the frequency division manner, the quantity of the resources occupied by the first data channel resource is not necessarily the same as a quantity of resources occupied by the second data channel resource in frequency domain. When the first data channel resource and the second data channel resource are arranged within the second frequency domain range in the time division manner, the quantity of the time domain units occupied by the first data channel resource is not necessarily the same as a quantity of time domain units occupied by the second data channel resource in time domain.

In this implementation, it is proposed that the first data channel resource and the second data channel resource are shared within the second frequency domain range, and the network device may determine, based on the service information of the first cell and the service information of the second cell, the quantity of the resources for scheduling the first data channel resource. This helps schedule the shared data channel resource based on the service information, so that more data channel resources can be allocated to a cell with a larger traffic volume or a cell with a higher service priority, thereby improving flexibility of scheduling the time-frequency resources while improving utilization of the time-frequency resources.

In a possible implementation, the first channel resource further includes a first control channel resource, and the second channel resource further includes a second control channel resource. The first control channel resource and the second control channel resource are equally arranged within the first frequency domain range in frequency domain, or the first control channel resource and the second control channel resource are located on two sides outside the second frequency domain range.

In a possible implementation, when the first control channel resource and the second control channel resource are used for downlink scheduling, the first control channel resource and the second control channel resource are equally arranged within the first frequency domain range in frequency domain, and the second frequency domain range is equal to the first frequency domain range. In this case, the first control channel resource includes a resource of a first physical downlink control channel (PDCCH), the second control channel resource includes a resource of a second physical downlink control channel PDCCH, and the resource of the first PDCCH and the resource of the second PDCCH are equally arranged within the first frequency domain range in frequency domain. In addition, the first data channel resource includes a resource of a first physical downlink shared channel (PDSCH), the second data channel resource includes a resource of a second physical downlink shared channel PDSCH, and the resource of the first PDSCH and the resource of the second PDSCH are arranged within the second frequency domain range in the time division or frequency division manner.

In a possible implementation, the first channel resource further includes a first common channel resource, the second channel resource further includes a second common channel resource, the first common channel resource and the resource of the first PDCCH are located on same subcarriers and different symbols in a same slot, and the second common channel resource and the resource of the second PDCCH are located on same subcarriers and different symbols in a same slot. The first common channel resource and the second common channel resource are equally arranged within the first frequency domain range in frequency domain.

The first common channel resource is a resource of a synchronization signal block (SSB) of the first cell, and the second common channel resource is a resource of a synchronization signal block SSB of the second cell; or the first common channel resource is a resource of other system information (OSI) of the first cell, and the second common channel resource is a resource of other system information OSI of the second cell; or the first common channel resource is a resource of system paging of the first cell, and the second common channel resource is a resource of system paging of the second cell; or the first common channel resource is a resource of a system information block type 1 SIB1 of the first cell, and the second common channel resource is a resource of a system information block type 1 SIB1 of the second cell.

For example, the resource of the SSB of the first cell and the resource of the first PDCCH occupy same subcarriers in frequency domain, and occupy different symbols in time domain; and the resource of the SSB of the second cell and the resource of the second PDCCH occupy same subcarriers in frequency domain, and occupy different symbols in time domain. For example, the resource of the OSI of the first cell and the resource of the first PDCCH occupy same subcarriers in frequency domain, and occupy different symbols in time domain; and the resource of the OSI of the second cell and the resource of the second PDCCH occupy same subcarriers in frequency domain, and occupy different symbols in time domain. For example, the resource of the system paging of the first cell and the resource of the first PDCCH occupy same subcarriers in frequency domain, and occupy different symbols in time domain; and the resource of the system paging of the second cell and the resource of the second PDCCH occupy same subcarriers in frequency domain, and occupy different symbols in time domain. For example, the resource of the system information block type 1 SIB1 of the first cell and the resource of the first PDCCH occupy same subcarriers in frequency domain, and occupy different symbols in time domain; and the resource of the system information block type 1 SIB1 of the second cell and the resource of the second PDCCH occupy same subcarriers in frequency domain, and occupy different symbols in time domain.

In this implementation, it is proposed that the channel resources of the cells not only include the resources of the PDCCHs and the resources of the PDSCHs, but also include resources of common channels such as the resources of the synchronization signal blocks SSBs, the resources of the other system information OSI, the resources of the system paging, and the resources of the system information block types 1 SIB1s. The various resources of the common channels may all be arranged in the frequency division manner based on the frequency domain range of the resources of the PDCCHs of the cells, to avoid co-channel interference between the common channels.

In a possible implementation, the first channel resource further includes a first common channel resource, the second channel resource further includes a second common channel resource, the first common channel resource and the resource of the first PDCCH are located on same subcarriers and different symbols in a same slot, and the second common channel resource and the resource of the second PDCCH are located on same subcarriers and different symbols in a same slot. The first common channel resource and the second common channel resource are located in different slots in time domain, or the first common channel resource and the second common channel resource are located on different symbols in a same slot in time domain.

The first common channel resource is a resource of an SSB of the first cell, and the second common channel resource is a resource of an SSB of the second cell; or the first common channel resource is a resource of other system information OSI of the first cell, and the second common channel resource is a resource of other system information OSI of the second cell; or the first common channel resource is a resource of system paging of the first cell, and the second common channel resource is a resource of system paging of the second cell; or the first common channel resource is a resource of a system information block type 1 SIB1 of the first cell, and the second common channel resource is a resource of a system information block type 1 SIB1 of the second cell.

In this implementation, it is proposed that the channel resources of the cells not only include the resources of the PDCCHs and the resources of the PDSCHs, but also include resources of common channels such as the resources of the synchronization signal blocks SSBs, the resources of the other system information OSI, the resources of the system paging, and the resources of the system information block types 1 SIB1s. The various resources of the common channels may all be arranged in the time division manner based on the frequency domain range of the resources of the PDCCHs of the cells, to avoid co-channel interference between the common channels.

In a possible implementation, the first channel resource further includes a resource of a CSI-RS of the first cell, the second channel resource further includes a resource of a CSI-RS of the second cell, and the resource of the CSI-RS of the first cell and the resource of the CSI-RS of the second cell are respectively located on same subcarriers and in different slots. Optionally, the resource of the CSI-RS of the first cell and the resource of the CSI-RS of the second cell are respectively located on same subcarriers and different symbols in a same slot.

In a possible implementation, the first channel resource further includes a resource of a TRS of the first cell, the second channel resource further includes a resource of a TRS of the second cell, and the resource of the TRS of the first cell and the resource of the TRS of the second cell are respectively located on different subcarriers on a same symbol in a same slot.

In this implementation, it is proposed that the resource of the TRS of the first cell and the resource of the TRS of the second cell may be located on a same symbol, but a pattern of the TRS of the first cell is different from a pattern of the TRS of the second cell. However, in a conventional technology, a TRS of only one cell may be arranged on one symbol. Therefore, compared with the conventional technology, this implementation helps improve resource utilization.

In a possible implementation, when the first control channel resource and the second control channel resource are used for uplink scheduling, the first control channel resource and the second control channel resource are located on two sides outside the second frequency domain range. In this case, the first control channel resource includes a resource of a first physical uplink control channel (PUCCH), the second control channel resource includes a resource of a second physical uplink control channel PUCCH, and the resource of the first PUCCH and the resource of the second PUCCH are located on the two sides outside the second frequency domain range in frequency domain. Certainly, the resource of the first PUCCH and the resource of the second PUCCH are located within the first frequency domain range, and the second frequency domain range is less than the first frequency domain range. In addition, the first data channel resource includes a resource of a first physical uplink shared channel (PUSCH), the second data channel resource includes a resource of a second physical uplink shared channel PUSCH, and the resource of the first PUSCH and the resource of the second PUSCH are arranged within the second frequency domain range in the time division or frequency division manner.

In a possible implementation, on any side outside the second frequency domain range, the resource of the first PUCCH and the resource of the second PUCCH occupy same subcarriers in frequency domain, and occupy different time domain units in time domain. Different time domain units may be understood as different symbols in a same slot. For example, on any side outside the second frequency domain range, the resource of the first PUCCH occupies first seven symbols in a slot, and the resource of the second PUCCH occupies last seven symbols in the slot. For another example, from a perspective of the entire frequency domain range, the resource of the first PUCCH occupies first seven symbols of a low frequency side RB and last seven symbols of a high frequency side RB in a slot, and the resource of the second PUCCH occupies first seven symbols of a high frequency side RB and last seven symbols of a low frequency side RB in a slot.

In a possible implementation, in a same time domain unit, the resource of the first PUCCH and the resource of the second PUCCH are respectively located on the two sides outside the second frequency domain range. Optionally, in a same symbol, the resource of the first PUCCH and the resource of the second PUCCH are respectively located on the two sides outside the second frequency domain range.

In this implementation, it is proposed that the resource of the first PUCCH and the resource of the second PUCCH are arranged in a frequency hopping pattern multiplexing manner. This not only helps to fully arrange the resources of the PUCCHs of the two cells in one symbol, but also can ensure that the resources of the PUCCHs of the two cells do not interfere with each other. Therefore, co-channel interference can be avoided while resource utilization is improved.

In a possible implementation, the first channel resource includes a resource of a first random access channel PRACH, the second channel resource includes a resource of a second random access channel PRACH, the resource of the first PRACH is located on one side outside the second frequency domain range, and the resource of the second PRACH is located on the other side outside the second frequency domain range.

In a possible implementation, both the resource of the first PUCCH and the resource of the second PUCCH are located outside the resource of the first PRACH, and both the resource of the first PUCCH and the resource of the second PUCCH are located outside the resource of the second PRACH.

In a possible implementation, the resource of the first PUCCH includes a resource of a first common PUCCH, the resource of the second PUCCH includes a resource of a second common PUCCH, and the resource of the first common PUCCH and the resource of the second common PUCCH are located on the two sides outside and away from the second frequency domain range.

In a possible implementation, the resource of the first common PUCCH and the resource of the second common PUCCH occupy a same resource block RB in frequency domain. In other words, the resource of the first common PUCCH and the resource of the second common PUCCH are compressed to the same RB for sending, but in a conventional technology, the resources of the PUCCHs of different cells each occupy one RB. Therefore, this implementation helps save a resource of the one RB, and helps improve resource utilization.

In a possible implementation, the resource of the first PUCCH further includes a resource of a PUCCH in at least one dedicated format, the resource of the second PUCCH further includes a resource of a PUCCH in at least one dedicated format, and the resource of the PUCCH in the dedicated format is located on an inner side between the resource of the first common PUCCH and the resource of the second common PUCCH.

In a possible implementation, the resource of the PUCCH in the dedicated format is located on the inner side between the resource of the first common PUCCH and the resource of the second common PUCCH, and the PUCCH in the dedicated format includes any one of a PUCCH in a format 0, a PUCCH in a format 1, a PUCCH in a format 2, a PUCCH in a format 3, and a PUCCH in a format 4.

According to a second aspect, this application provides another communication method. In the method, a terminal device obtains information about a first channel resource of a first cell and information about a second channel resource of a second cell. Then, the terminal device communicates with a network side by using the first channel resource of the first cell and/or the second channel resource of the second cell. The information about the first channel resource indicates a time-frequency domain position of one or more channels of the first cell. The information about the second channel resource indicates a position of a time-frequency resource of one or more channels of the second cell.

The first cell and the second cell are intra-frequency co-coverage cells of each other, the first channel resource and the second channel resource are arranged within a first frequency domain range in a time division or frequency division manner, and the first frequency domain range is a frequency domain range in which a frequency domain resource of the first cell overlaps a frequency domain resource of the second cell.

It should be understood that when the terminal device obtains the information about the first channel resource of the first cell and the information about the second channel resource of the second cell, and an indication indicating that a channel resource is not used is not included, the terminal device communicates with the network side by using the first channel resource of the first cell and/or the second channel resource of the second cell. When the terminal device obtains the information about the first channel resource and the information about the second channel resource of the second cell, and an indication indicating that the second cell is not used is further included, the terminal device communicates with the network side by using the first channel resource of the first cell. Similarly, if the received indication indicates that the first cell is not used, the terminal device communicates with the network side by using the information about the second channel resource of the second cell.

It should be understood that co-coverage means that coverage of the first cell and coverage of the second cell are the same or nearly overlap in space or on the ground, so that when the terminal device searches for a nearby cell, if the terminal device can find the first cell, there is a high probability that the terminal device can also find the second cell. Optionally, when there is no other cell near the first cell and the second cell, the coverage of the first cell may partially overlap the coverage of the second cell. In this implementation, alternatively, when the terminal device searches for a nearby cell, if the terminal device can find the first cell, there is a high probability that the terminal device can also find the second cell.

It should be understood that intra-frequency means that a frequency band of the first cell in a frequency range is the same as a frequency band of the second cell in a frequency range, or a frequency band of the first cell in a frequency range partially overlaps a frequency band of the second cell in a frequency range. The first frequency domain range is the frequency domain range in which the frequency domain resource of the first cell overlaps the frequency domain resource of the second cell. Optionally, if the frequency domain resource of the first cell is completely the same as the frequency domain resource of the second cell, each of a range of the frequency domain resource of the first cell and a range of the frequency domain resource of the second cell is equal to the first frequency domain range. Optionally, if the frequency domain resource of the first cell partially overlaps the frequency domain resource of the second cell, the first frequency domain range is an intersection of a frequency domain range of the first cell and a frequency domain range of the second cell.

In this application, the two intra-frequency co-coverage cells are established within a same spectrum, and time-frequency resources respectively used by the two cells are arranged in a time division or frequency division manner to avoid co-channel interference, so that the two cells back up each other. When one cell of the cells is abnormal, the other cell can still provide a service for the terminal device. Specifically, if the terminal device has the RRC connection to both the two cells, when one of the cells is faulty, the connection between the other cell and the terminal device is not interrupted. Therefore, a service of the terminal device is not interrupted. It may also be understood that if the terminal device has the RRC connection to either of the two cells, when the cell connected to the terminal device is faulty, the terminal device can quickly reselect the other cell of the two cells. Therefore, the service of the terminal device is almost not interrupted or is interrupted only for short time.

In a possible implementation, the first cell and the second cell each belong to a different network device.

In a possible implementation, the first cell and the second cell use a same standard.

In a possible implementation, the first cell and/or the second cell maintain/maintains a radio resource control RRC connection to the terminal device.

In a possible implementation, the first frequency domain range includes a second frequency domain range, the second frequency domain range is near a center frequency of the first frequency domain range, and the second frequency domain range is less than or equal to the first frequency domain range. A first data channel resource of the first cell and a second data channel resource of the second cell are arranged within the second frequency domain range in the time division or frequency division manner.

When the first data channel resource and the second data channel resource are arranged within the second frequency domain range in the frequency division manner, a quantity of resources occupied by the first data channel resource is not necessarily the same as a quantity of resources occupied by the second data channel resource in frequency domain. When the first data channel resource and the second data channel resource are arranged within the second frequency domain range in the time division manner, the quantity of the time domain units occupied by the first data channel resource is not necessarily the same as a quantity of time domain units occupied by the second data channel resource in time domain.

In a possible implementation, the quantity of the resources occupied by the first data channel resource in frequency domain is determined based on service information of the first cell and service information of the second cell; and/or the quantity of the time domain units occupied by the second data channel resource in time domain is determined based on the service information of the first cell and the service information of the second cell. The service information includes service-related information such as a traffic volume and a service priority.

In a possible implementation, the first channel resource further includes a first control channel resource, and the second channel resource further includes a second control channel resource. The first control channel resource and the second control channel resource are equally arranged within the first frequency domain range in frequency domain, or the first control channel resource and the second control channel resource are located on two sides outside the second frequency domain range.

In a possible implementation, when the first control channel resource and the second control channel resource are used for downlink scheduling, the first control channel resource and the second control channel resource are equally arranged within the first frequency domain range in frequency domain, and the second frequency domain range is equal to the first frequency domain range. In this case, the first control channel resource includes a resource of a first physical downlink control channel PDCCH, the second control channel resource includes a resource of a second physical downlink control channel PDCCH, and the resource of the first PDCCH and the resource of the second PDCCH are equally arranged within the first frequency domain range in frequency domain. In addition, the first data channel resource includes a resource of a first physical downlink shared channel PDSCH, the second data channel resource includes a resource of a second physical downlink shared channel PDSCH, and the resource of the first PDSCH and the resource of the second PDSCH are equally arranged within the second frequency domain range in the time frequency or frequency division manner.

In a possible implementation, the first channel resource further includes a first common channel resource, the second channel resource further includes a second common channel resource, the first common channel resource and the resource of the first PDCCH are located on same subcarriers and different symbols in a same slot, and the second common channel resource and the resource of the second PDCCH are located on same subcarriers and different symbols in a same slot. The first common channel resource and the second common channel resource are equally arranged within the first frequency domain range in frequency domain.

The first common channel resource is a resource of a synchronization signal block SSB of the first cell, and the second common channel resource is a resource of a synchronization signal block SSB of the second cell; or the first common channel resource is a resource of other system information OSI of the first cell, and the second common channel resource is a resource of other system information OSI of the second cell; or the first common channel resource is a resource of system paging of the first cell, and the second common channel resource is a resource of system paging of the second cell; or the first common channel resource is a resource of a system information block type 1 SIB1 of the first cell, and the second common channel resource is a resource of a system information block type 1 SIB1 of the second cell.

For example, the resource of the SSB of the first cell and the resource of the first PDCCH occupy same subcarriers in frequency domain, and occupy different symbols in time domain; and the resource of the SSB of the second cell and the resource of the second PDCCH occupy same subcarriers in frequency domain, and occupy different symbols in time domain. For example, the resource of the OSI of the first cell and the resource of the first PDCCH occupy same subcarriers in frequency domain, and occupy different symbols in time domain; and the resource of the OSI of the second cell and the resource of the second PDCCH occupy same subcarriers in frequency domain, and occupy different symbols in time domain. For example, the resource of the system paging of the first cell and the resource of the first PDCCH occupy same subcarriers in frequency domain, and occupy different symbols in time domain; and the resource of the system paging of the second cell and the resource of the second PDCCH occupy same subcarriers in frequency domain, and occupy different symbols in time domain. For example, the resource of the system information block type 1 SIB1 of the first cell and the resource of the first PDCCH occupy same subcarriers in frequency domain, and occupy different symbols in time domain; and the resource of the system information block type 1 SIB1 of the second cell and the resource of the second PDCCH occupy same subcarriers in frequency domain, and occupy different symbols in time domain.

In a possible implementation, the first channel resource further includes a first common channel resource, the second channel resource further includes a second common channel resource, the first common channel resource and the resource of the first PDCCH are located on same subcarriers and different symbols in a same slot, and the second common channel resource and the resource of the second PDCCH are located on same subcarriers and different symbols in a same slot. The first common channel resource and the second common channel resource are located in different slots in time domain, or the first common channel resource and the second common channel resource are located on different symbols in a same slot in time domain.

The first common channel resource is a resource of an SSB of the first cell, and the second common channel resource is a resource of an SSB of the second cell; or the first common channel resource is a resource of other system information OSI of the first cell, and the second common channel resource is a resource of other system information OSI of the second cell; or the first common channel resource is a resource of system paging of the first cell, and the second common channel resource is a resource of system paging of the second cell; or the first common channel resource is a resource of a system information block type 1 SIB1 of the first cell, and the second common channel resource is a resource of a system information block type 1 SIB1 of the second cell.

In a possible implementation, the first channel resource further includes a resource of a CSI-RS of the first cell, the second channel resource further includes a resource of a CSI-RS of the second cell, and the resource of the CSI-RS of the first cell and the resource of the CSI-RS of the second cell are respectively located on same subcarriers and in different slots. Optionally, the resource of the CSI-RS of the first cell and the resource of the CSI-RS of the second cell are respectively located on same subcarriers and different symbols in a same slot.

In a possible implementation, the first channel resource further includes a resource of a TRS of the first cell, the second channel resource further includes a resource of a TRS of the second cell, and the resource of the TRS of the first cell and the resource of the TRS of the second cell are respectively located on different subcarriers on a same symbol in a same slot.

In this implementation, it is proposed that the resource of the TRS of the first cell and the resource of the TRS of the second cell may be located on a same symbol, but a pattern of the TRS of the first cell is different from a pattern of the TRS of the second cell. However, in a conventional technology, a TRS of only one cell may be arranged on one symbol. Therefore, compared with the conventional technology, this implementation helps improve resource utilization.

In a possible implementation, when the first control channel resource and the second control channel resource are used for uplink scheduling, the first control channel resource and the second control channel resource are located on two sides outside the second frequency domain range. In this case, the first control channel resource includes a resource of a first physical uplink control channel PUCCH, the second control channel resource includes a resource of a second physical uplink control channel PUCCH, and the resource of the first PUCCH and the resource of the second PUCCH are located on the two sides outside the second frequency domain range in frequency domain. Certainly, the resource of the first PUCCH and the resource of the second PUCCH are located within the first frequency domain range, and the second frequency domain range is less than the first frequency domain range. In addition, the first data channel resource includes a resource of a first physical uplink shared channel PUSCH, the second data channel resource includes a resource of a second physical uplink shared channel PUSCH, and the resource of the first PUSCH and the resource of the second PUSCH are arranged within the second frequency domain range in the time division or frequency division manner.

In a possible implementation, on any side outside the second frequency domain range, the resource of the first PUCCH and the resource of the second PUCCH occupy same subcarriers in frequency domain, and occupy different time domain units in time domain. Different time domain units may be understood as different symbols in a same slot. For example, the resource of the first PUCCH occupies first seven symbols in a slot, and the resource of the second PUCCH occupies last seven symbols in the slot.

In a possible implementation, in a same time domain unit, the resource of the first PUCCH and the resource of the second PUCCH are respectively located on the two sides outside the second frequency domain range. Optionally, in a same symbol, the resource of the first PUCCH and the resource of the second PUCCH are respectively located on the two sides outside the second frequency domain range.

In this implementation, it is proposed that the resource of the first PUCCH and the resource of the second PUCCH are arranged in a frequency hopping pattern multiplexing manner. This not only helps to fully arrange the resources of the PUCCHs of the two cells in one symbol, but also can ensure that the resources of the PUCCHs of the two cells do not interfere with each other. Therefore, co-channel interference can be avoided while resource utilization is improved.

In a possible implementation, the first channel resource includes a resource of a first random access channel PRACH, the second channel resource includes a resource of a second random access channel PRACH, the resource of the first PRACH is located on one side outside the second frequency domain range, and the resource of the second PRACH is located on the other side outside the second frequency domain range.

In a possible implementation, both the resource of the first PUCCH and the resource of the second PUCCH are located outside the resource of the first PRACH, and both the resource of the first PUCCH and the resource of the second PUCCH are located outside the resource of the second PRACH.

In a possible implementation, the resource of the first PUCCH includes a resource of a first common PUCCH, the resource of the second PUCCH includes a resource of a second common PUCCH, and the resource of the first common PUCCH and the resource of the second common PUCCH are located on the two sides outside and away from the second frequency domain range.

In a possible implementation, the resource of the first common PUCCH and the resource of the second common PUCCH occupy a same resource block RB in frequency domain. In other words, the resource of the first common PUCCH and the resource of the second common PUCCH are compressed to the same RB for sending, but in a conventional technology, the resources of the PUCCHs of different cells each occupy one RB. Therefore, this implementation helps save a resource of the one RB, and helps improve resource utilization.

In a possible implementation, the resource of the first PUCCH further includes a resource of a PUCCH in at least one dedicated format, the resource of the second PUCCH further includes a resource of a PUCCH in at least one dedicated format, and the resource of the PUCCH in the dedicated format is located on an inner side between the resource of the first common PUCCH and the resource of the second common PUCCH.

In a possible implementation, the resource of the PUCCH in the dedicated format is located on the inner side between the resource of the first common PUCCH and the resource of the second common PUCCH, and the PUCCH in the dedicated format includes any one of a PUCCH in a format 0, a PUCCH in a format 1, a PUCCH in a format 2, a PUCCH in a format 3, and a PUCCH in a format 4.

It should be noted that there are further a plurality of other specific implementations in this embodiment of this application. For details, refer to the specific implementations of the first aspect and beneficial effects thereof. Details are not described herein again.

According to a third aspect, this application further provides a communication method. In the method, a terminal device communicates with a network side by using a first channel resource of a first cell and a second channel resource of a second cell. When the first cell is abnormal, the terminal device communicates with the network side by using the second channel resource of the second cell. The first cell and the second cell are intra-frequency co-coverage cells of each other, the first channel resource and the second channel resource are arranged within a first frequency domain range in a time division or frequency division manner, and the first frequency domain range is a frequency domain range in which a frequency domain resource of the first cell overlaps a frequency domain resource of the second cell.

The first cell and the second cell are the intra-frequency and co-coverage cells of each other, the frequency domain resource of the first cell is the same as the frequency domain resource of the second cell, the first channel resource and the second channel resource are arranged within the first frequency domain range in the time division or frequency division manner, and the first frequency domain range is a range of the same frequency domain resources of the first cell and the second cell.

It should be understood that when the terminal device obtains the information about the first channel resource of the first cell and the information about the second channel resource of the second cell, and an indication indicating that a channel resource is not used is not included, the terminal device communicates with the network side by using the first channel resource of the first cell and/or the second channel resource of the second cell. When the terminal device obtains the information about the first channel resource and the information about the second channel resource of the second cell, and an indication indicating that the second cell is not used is further included, the terminal device communicates with the network side by using the first channel resource of the first cell. Similarly, if the received indication indicates that the first cell is not used, the terminal device communicates with the network side by using the information about the second channel resource of the second cell.

It should be understood that co-coverage means that coverage of the first cell and coverage of the second cell are the same or nearly overlap in space or on the ground, so that when the terminal device searches for a nearby cell, if the terminal device can find the first cell, there is a high probability that the terminal device can also find the second cell. Optionally, when there is no other cell near the first cell and the second cell, the coverage of the first cell may partially overlap the coverage of the second cell. In this implementation, alternatively, when the terminal device searches for a nearby cell, if the terminal device can find the first cell, there is a high probability that the terminal device can also find the second cell.

It should be understood that intra-frequency means that a frequency band of the first cell in a frequency range is the same as a frequency band of the second cell in a frequency range, or a frequency band of the first cell in a frequency range partially overlaps a frequency band of the second cell in a frequency range. The first frequency domain range is the frequency domain range in which the frequency domain resource of the first cell overlaps the frequency domain resource of the second cell. Optionally, if the frequency domain resource of the first cell is completely the same as the frequency domain resource of the second cell, each of a range of the frequency domain resource of the first cell and a range of the frequency domain resource of the second cell is equal to the first frequency domain range. Optionally, if the frequency domain resource of the first cell partially overlaps the frequency domain resource of the second cell, the first frequency domain range is an intersection of a frequency domain range of the first cell and a frequency domain range of the second cell.

In this application, the two intra-frequency co-coverage cells are established within a same spectrum, and time-frequency resources respectively used by the two cells are arranged in a time division or frequency division manner to avoid co-channel interference, so that the two cells back up each other. When one cell of the cells is abnormal, the other cell can still provide a service for the terminal device. Specifically, if the terminal device has the RRC connection to both the two cells, when one of the cells is faulty, the connection between the other cell and the terminal device is not interrupted. Therefore, a service of the terminal device is not interrupted. It may also be understood that if the terminal device has the RRC connection to either of the two cells, when the cell connected to the terminal device is faulty, the terminal device can quickly reselect the other cell of the two cells. Therefore, the service of the terminal device is almost not interrupted or is interrupted only for short time.

In a possible implementation, the first cell and the second cell each belong to a different network device.

In a possible implementation, the first cell and the second cell use a same standard.

In a possible implementation, the first cell and/or the second cell maintain/maintains a radio resource control RRC connection to the terminal device.

It should be noted that for an arrangement manner of the first channel resource and the second channel resource in the first frequency domain range, refer to any implementation of the first aspect and beneficial effects. Details are not described herein again.

According to a fourth aspect, this application provides a communication apparatus, including an obtaining module and a communication module. The obtaining module is configured to obtain information about a first channel resource of a first cell served by a network device, where the first cell and a second cell are intra-frequency co-coverage cells of each other, the first channel resource and a second channel resource of the second cell are arranged within a first frequency domain range in a time division or frequency division manner, and the first frequency domain range is a frequency domain range in which a frequency domain resource of the first cell overlaps a frequency domain resource of the second cell. The communication module is configured to communicate with a terminal device based on the information about the first channel resource and information about the second channel resource.

In a possible implementation, the obtaining module is specifically configured to: obtain the information about the second channel resource; and determine the information about the first channel resource based on the information about the second channel resource.

In a possible implementation, the obtaining module is further configured to: obtain service information of the first cell and service information of the second cell; and determine, based on the service information of the first cell and the service information of the second cell, a quantity of resources occupied by the first data channel resource in frequency domain or a quantity of time domain units occupied by the first data channel resource in time domain. The service information includes service-related information such as a traffic volume and a service priority.

It should be noted that for an arrangement manner of the first channel resource and the second channel resource in the first frequency domain range, refer to any implementation of the first aspect and beneficial effects. Details are not described herein again.

According to a fifth aspect, this application provides a communication apparatus, including an obtaining module and a communication module. The obtaining module is configured to obtain information about a first channel resource of a first cell and information about a second channel resource of a second cell. The communication module is configured to communicate with a network side by using the first channel resource of the first cell and the second channel resource of the second cell. The first cell and the second cell are intra-frequency co-coverage cells of each other, the first channel resource and the second channel resource are arranged within a first frequency domain range in a time division or frequency division manner, and the first frequency domain range is a frequency domain range in which a frequency domain resource of the first cell overlaps a frequency domain resource of the second cell.

It should be noted that for an arrangement manner of the first channel resource and the second channel resource in the first frequency domain range, refer to any implementation of the first aspect and beneficial effects. Details are not described herein again.

According to a sixth aspect, this application provides a communication apparatus, including: a communication module, configured to communicate with a network side by using a first channel resource of a first cell and a second channel resource of a second cell; and when the first cell is abnormal, the communication module is further configured to communicate with the network side by using the second channel resource of the second cell. The first cell and the second cell are intra-frequency co-coverage cells of each other, the first channel resource and the second channel resource are arranged within a first frequency domain range in a time division or frequency division manner, and the first frequency domain range is a frequency domain range in which a frequency domain resource of the first cell overlaps a frequency domain resource of the second cell.

It should be noted that for an arrangement manner of the first channel resource and the second channel resource in the first frequency domain range, refer to any implementation of the first aspect and beneficial effects. Details are not described herein again.

According to a seventh aspect, an embodiment of this application provides a communication apparatus. The communication apparatus may be the network device in the foregoing implementations, or may be a chip in the network device. The communication apparatus may include a processing module and a transceiver module. When the communication apparatus is the network device, the processing module may be a processor, and the transceiver module may be a transceiver. The network device may further include a storage module, and the storage module may be a memory. The storage module is configured to store instructions, and the processing module executes the instructions stored in the storage module, so that the network device performs the method in any one of the first aspect or the implementations of the first aspect. When the communication apparatus is the chip in the network device, the processing module may be a processor, and the transceiver module may be an input/output interface, a pin, a circuit, or the like. The processing module executes the instructions stored in the storage module, so that the network device performs the method in any one of the first aspect or the implementations of the first aspect. The storage module may be a storage module (for example, a register or a cache) in the chip, or may be a storage module (for example, a read-only memory or a random access memory) that is in the network device and that is located outside the chip.

According to an eighth aspect, an embodiment of this application provides a communication apparatus. The communication apparatus may be the terminal device in the foregoing implementations, or may be a chip in the terminal device. The communication apparatus may include a processing module and a transceiver module. When the communication apparatus is the terminal device, the processing module may be a processor, and the transceiver module may be a transceiver. The terminal device may further include a storage module, and the storage module may be a memory. The storage module is configured to store instructions, and the processing module executes the instructions stored in the storage module, so that the terminal device performs the method in any one of the second aspect or the implementations of the second aspect, or the method in any one of the third aspect or the implementations of the third aspect. When the communication apparatus is the chip in the terminal device, the processing module may be a processor, and the transceiver module may be an input/output interface, a pin, a circuit, or the like. The processing module executes the instructions stored in the storage module, so that the terminal device performs the method in any one of the second aspect or the implementations of the second aspect, or the method in any one of the third aspect or the implementations of the third aspect. The storage module may be a storage module (for example, a register or a cache) in the chip, or may be a storage module (for example, a read-only memory or a random access memory) that is in the terminal device and that is located outside the chip.

According to a ninth aspect, this application provides a communication apparatus. The apparatus may be an integrated circuit chip. The integrated circuit chip includes a processor. The processor is coupled to a memory. The memory is configured to store a program or instructions. When the program or the instructions are executed by the processor, the communication apparatus is enabled to perform the method in any one of the first aspect or the implementations of the first aspect.

According to a tenth aspect, this application provides a communication apparatus. The apparatus may be an integrated circuit chip. The integrated circuit chip includes a processor. The processor is coupled to a memory. The memory is configured to store a program or instructions. When the program or the instructions are executed by the processor, the communication apparatus is enabled to perform the method in any one of the second aspect or the implementations of the second aspect, or the method in any one of the third aspect or the implementations of the third aspect.

According to an eleventh aspect, an embodiment of this application provides a computer program product including instructions. When the computer program product runs on a computer, the computer is enabled to perform the method described in any one of the first aspect, the second aspect, and the third aspect, and the implementations of the foregoing aspects.

According to a twelfth aspect, an embodiment of this application provides a computer-readable storage medium, including instructions. When the instructions are run on a computer, the computer is enabled to perform the method described in any one of the first aspect, the second aspect, and the third aspect, and the implementations of the foregoing aspects.

According to a thirteenth aspect, an embodiment of this application provides a communication system. The communication system includes the network device in any one of the first aspect and the implementations of the first aspect, and the terminal device in any one of the second aspect and the implementations of the second aspect. Alternatively, the communication system includes the network device in any one of the first aspect and the implementations of the first aspect, and the terminal device in any one of the third aspect and the implementations of the third aspect.

It can be learned from the foregoing technical solutions that embodiments of this application have the following advantages.

In this application, two intra-frequency co-coverage cells are established within a same frequency band, and time-frequency resources respectively used by the two cells are arranged in a time division or frequency division manner to avoid co-channel interference, so that the two cells back up each other. When one cell of the cells is abnormal, the other cell can still provide a service for the terminal device. Because the two cells share the frequency band, spectrum resources can be reduced, and consumption of bandwidth resources can be reduced. In addition, radio resource utilization can be improved while a reliability gain of dual-network system-level backup is obtained.

BRIEF DESCRIPTION OF THE DRAWINGS

To describe the technical solutions in embodiments of this application more clearly, the following briefly describes the accompanying drawings for describing the embodiments. It is clear that the accompanying drawings in the following descriptions show merely some embodiments of this application.

DETAILED DESCRIPTION OF ILLUSTRATIVE EMBODIMENTS

Figure 1:
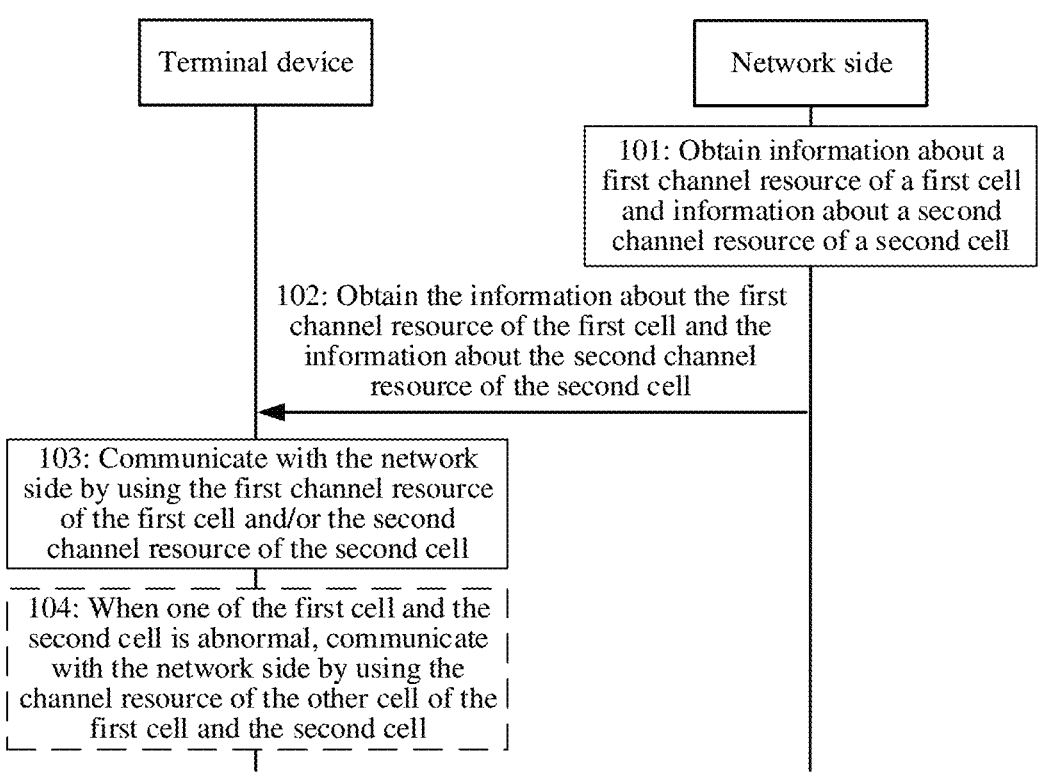
FIG. 1 is a flowchart of a communication method according to this application.

The following clearly and completely describes the technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the terms used in such a way are interchangeable in proper circumstances, so that the embodiments described herein can be implemented in other orders than the order illustrated or described herein. In addition, the terms "include", "have" and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to such a process, method, product, or device.

The following first describes a system architecture and an application scenario to which a communication method provided in this application is applicable.

The communication method provided in this application may be applied to cellular mobile communication systems of various standards, for example, a long term evolution (LTE) communication system, a 5G New Radio (5G NR) system, the 6th generation mobile information technology (6G) system, and a subsequent evolved standard. This is not limited in this application. The communication system includes at least one terminal device and at least one network device.

The terminal device includes a device that provides voice and/or data connectivity for a user. For example, the terminal device may include a handheld device with a wireless connection function, or a processing device connected to a wireless modem. The terminal device may communicate with a core network (for example, a 5th generation core (5GC, or 5G core) network) through a radio access network (RAN), and may exchange voice and/or data with the RAN. The terminal device may also be referred to as a terminal, user equipment (user equipment, UE), a wireless terminal device, a mobile terminal (MT) device, a subscriber unit, a subscriber station, a mobile station (MS), a remote station, an access point (AP), a remote terminal device, an access terminal device, a user terminal device, a user agent, a user device, or the like. In addition, the terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application. It should be understood that the terminal device in this application may be any one of the foregoing devices or chips. This is not specifically limited herein. Regardless of serving as a device or a chip, the terminal device may be manufactured, sold, or used as an independent product. In this embodiment and subsequent embodiments, only the terminal device is used as an example for description.

The network device may be any device with a wireless transceiver function, and may be responsible for functions related to an air interface, for example, a radio link maintenance function, a radio resource management function, and some mobility management functions. The radio link maintenance function is used to maintain a radio link to the terminal device, and is responsible for protocol conversion between radio link data and internet protocol (IP) data. The radio resource management function may include functions such as radio link establishment and release, and radio resource scheduling and allocation. Some mobility management functions may include configuring the terminal device to perform measurement, evaluating radio link quality of the terminal device, determining a handover of the terminal device between cells, and so on. For example, the network device may be an access network device (RAN) that currently provides a service for the terminal device. For example, the network device may include a next generation NodeB (gNB) in a 5G NR system, or may include a central unit (CU) and a distributed unit (DU) in a cloud access network (CloudRAN) system. The network device may further include a node (for example, an xNodeB) in a 6G system. This is not specifically limited herein. It should be understood that the network device in embodiments of this application may be any one of the foregoing devices or a chip in the foregoing device. This is not specifically limited herein. Regardless of serving as a device or a chip, the network device may be manufactured, sold, or used as an independent product. In this embodiment and subsequent embodiments, only the network device is used as an example for description.

In addition, the communication method in this application may be applied to a scenario in which network reliability needs to be improved, for example, a scenario in which spectrum resources are insufficient but a network reliability requirement is high. In the communication method, the terminal device can simultaneously communicate with a network side by using the foregoing two intra-frequency co-coverage cells. In addition, when one of the cells is faulty, the terminal device can communicate with the network side by using the other cell, to ensure that a service of the terminal device is not interrupted. The terminal device may alternatively access only one of the two intra-frequency co-coverage cells. When the cell accessed by the terminal device is faulty, the terminal device can quickly reselect the other cell of the two intra-frequency co-coverage cells, to ensure that a service of the terminal device is not interrupted or a service of the terminal device is only delayed or interrupted for short time. The following describes, with reference to FIG. 1, a main procedure of the communication method provided in this application.

Step 101: A network side obtains information about a first channel resource of a first cell and information about a second channel resource of a second cell.

The first cell and the second cell are intra-frequency co-coverage cells of each other.

Figure 2A:
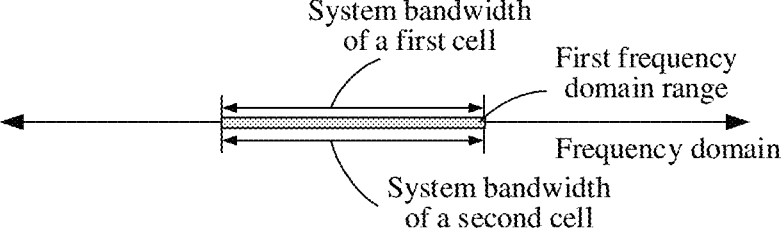
FIG. 2A is a schematic diagram of a relationship between system bandwidths of two intra-frequency cells according to this application.
Figure 2B:
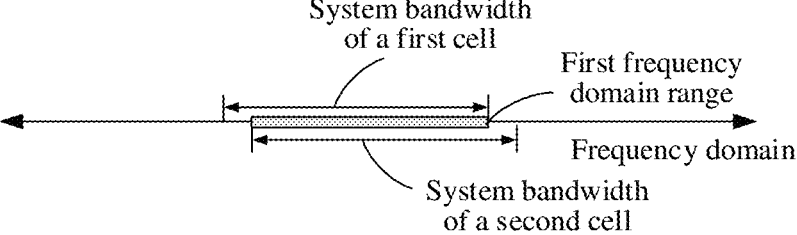
FIG. 2B is another schematic diagram of a relationship between system bandwidths of two intra-frequency cells according to this application.
Figure 2C:
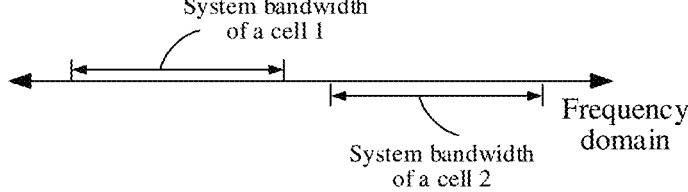
FIG. 2C is a schematic diagram of a relationship between system bandwidths of two inter-frequency cells in a conventional technology.

That the first cell and the second cell are intra-frequency cells means that a system bandwidth of the first cell partially or completely overlaps a system bandwidth of the second cell in frequency domain. For ease of description, a range of frequency domain resources in an overlapping part of the system bandwidths of the two cells is referred to as a first frequency domain range, that is, the first frequency domain range is a frequency domain range in which the frequency domain resource of the first cell overlaps the frequency domain resource of the second cell. For example, as shown in FIG. 2A, that the two cells are intra-frequency cells may mean that the system bandwidth of the first cell completely overlaps the system bandwidth of the second cell. In this case, a range of the frequency domain resource of the first cell is completely the same as a range of the frequency domain resource of the second cell, that is, the range of the frequency domain resource of the first cell and the range of the frequency domain resource of the second cell each are the first frequency domain range. For example, as shown in FIG. 2B, that the two cells are intra-frequency cells may alternatively mean that the system bandwidth of the first cell may partially overlap the system bandwidth of the second cell. In this case, the first frequency domain range is an intersection of a range of the frequency domain resource of the first cell and a range of the frequency domain resource of the second cell. However, in a conventional technology, as shown in FIG. 2C, if the two cells are not the intra-frequency cells (for example, the two cells are inter-frequency cells), a system bandwidth of a cell 1 does not overlap a system bandwidth of a cell 2 in frequency domain, that is, the first frequency domain range proposed in this application does not exist.

Figure 3A:
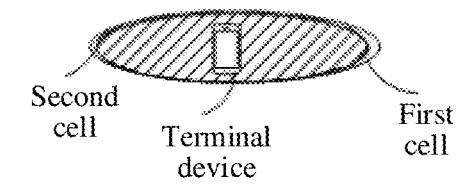
FIG. 3A is a schematic diagram of coverage of two co-coverage cells according to this application.
Figure 3B:
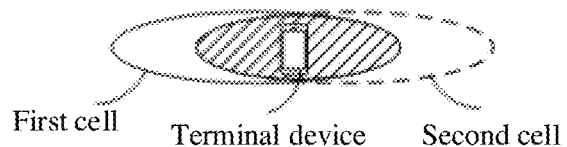
FIG. 3B is another schematic diagram of coverage of two co-coverage cells according to this application.

In addition, that the first cell and the second cell are co-coverage cells means that coverage of the first cell and coverage of the second cell are the same or partially overlap in space or on the ground. In a possible implementation, as shown in FIG. 3A, coverage of the first cell and coverage of the second cell are the same or nearly overlap in space or on the ground. In this case, when the terminal device searches for a nearby cell, if the terminal device can find the first cell, there is a high probability that the terminal device can also find the second cell. In another possible implementation, as shown in FIG. 3B, when there is no other cell near the first cell and the second cell, the coverage of the first cell may partially overlap the coverage of the second cell. In this implementation, alternatively, when the terminal device searches for a nearby cell, if the terminal device can find the first cell, there is a high probability that the terminal device can also find the second cell.

In addition, the two intra-frequency co-coverage cells may be cells served by different network devices (that is, the two cells belong to different network devices), or may be two cells served by a same network device (that is, the two cells belong to a same network device). It should be noted that whether the two cells belong to the same network device may be determined depending on whether hardware for establishing the first cell is the same as hardware for establishing the second cell. Specifically, it may be determined depending on whether antennas corresponding to the cells are connected to a same baseband processing unit. For example, if the antenna corresponding to the first cell and the antenna corresponding to the second cell are connected to the same BBU, the first cell and the second cell are cells belonging to the same network device. If two BBUs respectively connected to the antenna corresponding to the first cell and the antenna corresponding to the second cell are independent of each other, the first cell and the second cell are cells belonging to different network devices.

Figure 4A:
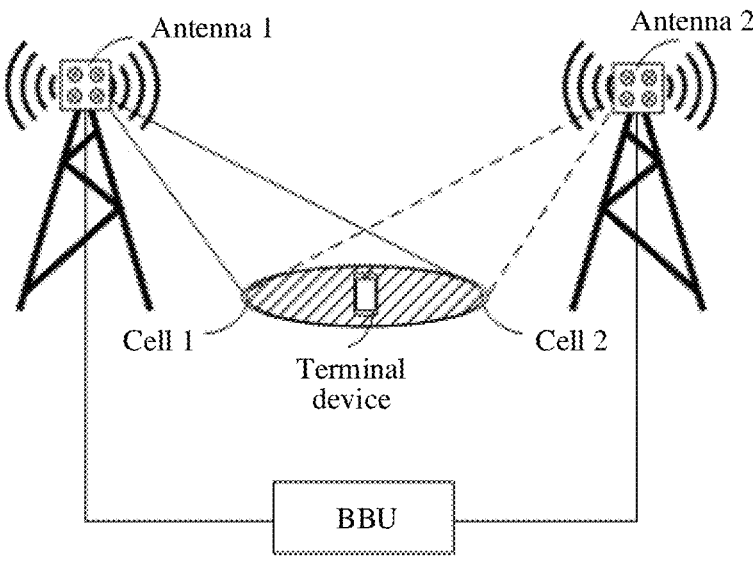
FIG. 4A is an example diagram of arranging hardware for generating intra-frequency co-coverage cells according to this application.
Figure 4B:
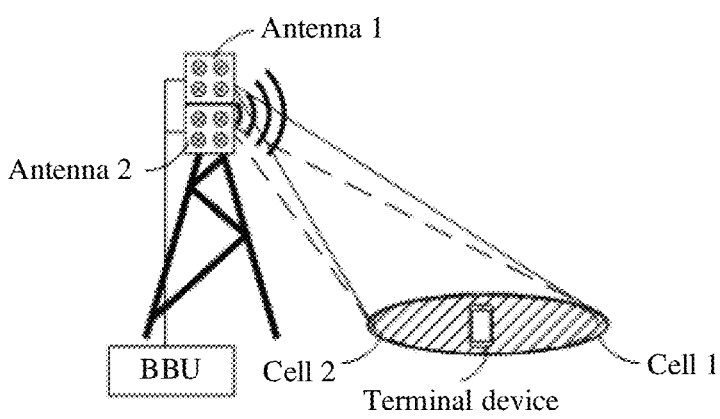
FIG. 4B is another example diagram of arranging hardware for generating intra-frequency co-coverage cells according to this application.

It should be noted that if each of the antenna corresponding to the first cell and the antenna corresponding to the second cell is connected to the same BBU, the antenna corresponding to the first cell and the antenna corresponding to the second cell may be disposed on different signal towers, or may be disposed on a same signal tower. For example, as shown in FIG. 4A, a cell 1 and a cell 2 are cells belonging to a same network device, the cell 1 is generated via an antenna 1, the cell 2 is generated via an antenna 2, and the antenna 1 and the antenna 2 are connected to a same BBU. However, the antenna 1 is disposed on a left-side signal tower, and the antenna 2 is disposed on a right-side signal tower. For example, as shown in FIG. 4B, a cell 1 and a cell 2 are cells belonging to a same network device, the cell 1 is generated via an antenna 1, the cell 2 is generated via an antenna 2, the antenna 1 and the antenna 2 are connected to a same BBU, and the antenna 1 and the antenna 2 are disposed on a same signal tower.

Figure 4C:
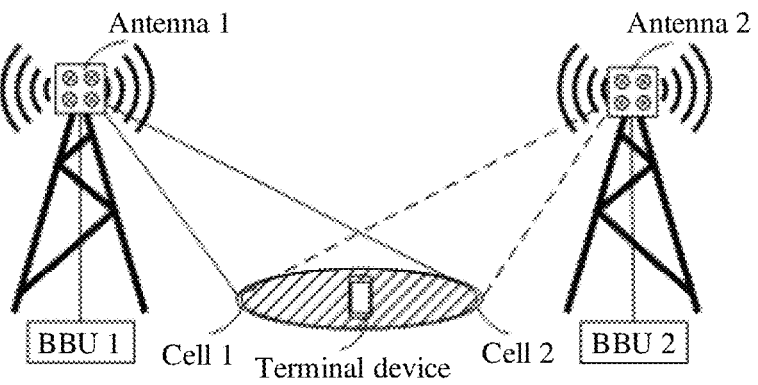
FIG. 4C is another example diagram of arranging hardware for generating intra-frequency co-coverage cells according to this application.
Figure 4D:
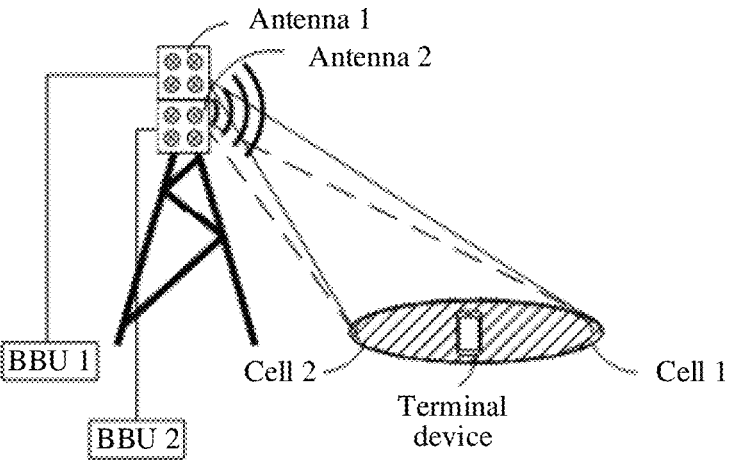
FIG. 4D is another example diagram of arranging hardware for generating intra-frequency co-coverage cells according to this application.

In addition, in actual application, if the antenna corresponding to the first cell and the antenna corresponding to the second cell are respectively connected to different BBUs, the antenna corresponding to the first cell and the antenna corresponding to the second cell may be disposed on different signal towers, or may be disposed on a same signal tower. For example, as shown in FIG. 4C, a cell 1 and a cell 2 are cells belonging to different network devices, where the cell 1 is generated via an antenna 1 on a left-side signal tower, the antenna 1 is connected to a BBU 1 under the left-side signal tower, the cell 2 is generated via an antenna 2 on a right-side signal tower, and the antenna 2 is connected to a BBU 2 under the right-side signal tower. For example, as shown in FIG. 4D, a cell 1 and a cell 2 are cells belonging to different network devices, where the cell 1 is generated via an antenna 1, the cell 2 is generated via an antenna 2, the antenna 1 is connected to a BBU 1, the antenna 2 is connected to a BBU 2, and the antenna 1 and the antenna 2 are disposed on a same signal tower.

It should be understood that, compared with a solution in which the two cells are established under the same network device, this solution in which the two cells are established under the different network devices has a stronger disaster tolerance capability. For example, when the first cell is abnormal due to a hardware fault of the first cell, because the first cell and the second cell belong to the different network devices, the second cell may not be affected due to an error in the first cell. If both the first cell and the second cell belong to the same network device, the first cell is abnormal due to a hardware fault of the network device, and the second cell may also have a risk of a fault.

It should be understood that, in actual application, there may be a plurality of pairs of intra-frequency co-coverage cells, and each pair of intra-frequency co-coverage cells may be disposed in any one of the foregoing manners in FIG. 4A, FIG. 4B, FIG. 4C, and FIG. 4D. In addition, when the coverage of the first cell partially overlaps the coverage of the second cell, any one of the foregoing manners in FIG. 4A, FIG. 4B, FIG. 4C, and FIG. 4D may also be used for disposition. This is not specifically limited in this application.

Optionally, the first cell and the second cell use a same standard. For example, both the first cell and the second cell are 5G NR cells. Alternatively, both the first cell and the second cell use subsequent evolved standards (for example, a 6G standard). Optionally, the first cell and the second cell use different standards. For example, one of the first cell and the second cell is a cell of a long term evolution LTE standard, and the other cell of the first cell and the second cell is a cell of a 5G or NR standard. For another example, one of the first cell and the second cell is a cell of an LTE standard, and the other cell of the first cell and the second cell is a cell of a 6G standard or a subsequent evolved standard. For another example, one of the first cell and the second cell is a cell of a 5G or NR standard, and the other cell of the first cell and the second cell is a cell of a 6G standard or a subsequent evolved standard.

In addition, the information about the first channel resource of the first cell indicates a time-frequency domain position of the channel resource of the first cell, and the information about the second channel resource of the second cell indicates a time-frequency domain position of the channel resource of the second cell. Because the first cell and the second cell are the intra-frequency co-coverage cells, to prevent interference between the two cells in a resource scheduling process, the channel resource (namely, the first channel resource) of the first cell and the channel resource (namely, the second channel resource) of the second cell are arranged within the first frequency domain range in a time division or frequency division manner, that is, the first channel resource and the second channel resource are arranged in the overlapping part of the system bandwidths of the first cell and the second cell in the time division or frequency division manner, so that the time-frequency resources are reduced while co-channel interference is avoided.

It should be understood that the resource in this application is the time-frequency resource. Usually, the time-frequency resource may be represented by using a resource block (RB) and a resource element (RE) based on different division granularities. One RB occupies one symbol (symbol) (for example, an orthogonal frequency division multiplexing (OFDM) symbol) in time domain, and occupies 12 subcarriers in frequency domain. One RE occupies one symbol in time domain, and occupies one subcarrier in frequency domain. One RB includes 12 REs.

Specifically, the channel resource of the cell includes a control channel resource, a data channel resource, a common channel resource, a resource of a reference signal, and the like. In this application, control channel resources of the two cells are arranged within the first frequency domain range in the frequency division manner, data channel resources of the two cells are shared and scheduled within the first frequency domain range based on service information, and common channel resources, resources of reference signals, and other resources that use the two cells are arranged within the first frequency domain range in the time division or frequency division manner. Specifically, the following provides detailed descriptions with reference to FIG. 5A and FIG. 5B, FIG. 6A to FIG. 6E, and FIG. 7A to FIG. 7H. Details are not described herein.

In this application, when the first cell and the second cell belong to the same network device, and the first cell and the second cell belong to the different network devices, manners in which a network side obtains information about a first channel resource and information about a second channel resource are different. The following separately describes the manners.

Manner 1: The first cell and the second cell belong to different network devices. For ease of description, the first cell belongs to a first network device, and the second cell belongs to a second network device. That a network side obtains information about a first channel resource of a first cell and information about a second channel resource of a second cell may be specifically understood as that the first network device obtains the information about the first channel resource, and the second network device obtains the information about the second channel resource.

In a possible implementation, the information about the first channel resource is directly configured in the first network device by operations and maintenance personnel. In this case, the first network device may directly obtain the information about the first channel resource from a storage apparatus in the first network device. Similarly, the information about the second channel resource is also directly configured in the second network device by the operations and maintenance personnel, and the second network device may directly obtain the information about the second channel resource from a storage apparatus in the second network device.

In this implementation, the first channel resource of the first cell and the second channel resource of the second cell are configured by the operations and maintenance personnel, and the network device does not need to obtain, from the other network device, the information about the channel resource that is of the cell and that is located in the other network device. This helps reduce implementation complexity of the network device, and ensure efficiency of constructing the first cell by the network device.

In another possible implementation, a manner of allocating the channel resources of the two intra-frequency co-coverage cells is agreed on. For example, patterns for distributing the respective channel resources of the two intra-frequency co-coverage cells are agreed on in a protocol, and the patterns may be understood as the information about the channel resources. When constructing one of the cells, the network device may select one of the two patterns. To avoid that the two network devices select a same pattern, the network device (for example, the first network device) may obtain, through an interface between the network devices, the information about the second channel resource that is of the second cell (for example, the pattern of the channel resource that is of the second cell) and that is in the network device (for example, the second network device) that has established the cell, and the first network device then infers the information about the first channel resource (for example, the pattern of the channel resource of the first cell) based on the information about the second channel resource.

In this implementation, the network devices may check the information about the channel resources, to avoid a conflict between the channel resources of the two cells.

Manner 2: The first cell and the second cell belong to the same network device. In this case, operations and maintenance personnel may configure both the information about the first channel resource and the information about the second channel resource for the network device; or may configure only the information about the channel resource (for example, the information about the first channel resource) of only one cell, and the network device then determines the information about the channel resource of the other cell (for example, the information about the second channel resource) based on the information about the channel resource of the one cell (for example, the information about the first channel resource).

Step 102: The terminal device obtains the information about the first channel resource of the first cell and the information about the second channel resource of the second cell.

In this embodiment, the terminal device may obtain the information about the first channel resource and the information about the second channel resource from one or more pieces of signaling exchanged with the network device. It should be understood that information about different types of channel resources is in different types of signaling. This is not specifically limited herein.

Step 103: The terminal device communicates with the network side by using the first channel resource of the first cell and/or the second channel resource of the second cell.

In a possible implementation, the terminal device communicates with the network side by using the first channel resource of the first cell and the second channel resource of the second cell. In this case, the terminal device maintains a radio resource control RRC connection to both the first cell and the second cell.

In another possible implementation, the terminal device communicates with the network side by using the first channel resource of the first cell or the second channel resource of the second cell. In this case, the terminal device maintains a radio resource control RRC connection to the first cell or the second cell.

Specifically, if the terminal device further receives, in addition to the information about the first channel resource and the information about the second channel resource, indication information indicating that a channel resource of a cell is not used, the terminal device communicates with the network side by using the channel resource of the other cell of the two cells.

For example, if the terminal device receives first indication information, and the first indication information indicates that the information about the first channel resource is not used, the terminal device communicates with the network side by using the second channel resource. In this case, the terminal device maintains the RRC connection only to the second cell.

For example, if the terminal device receives the second indication information, and the second indication information indicates that the information about the second channel resource is not used, the terminal device communicates with the network side by using the first channel resource. In this case, the terminal device maintains the RRC connection only to the first cell.

Step 104: When one of the first cell and the second cell is abnormal, the terminal device communicates with the network side by using the channel resource of the other cell of the first cell and the second cell.

In a possible implementation, the terminal device communicates with the network side by using the first channel resource of the first cell and the second channel resource of the second cell. If one of the first cell and the second cell is abnormal, the terminal device communicates with the network side by using the channel resource of the other cell of the first cell and the second cell.

In this implementation, the terminal device can simultaneously communicate with the network side by using the two intra-frequency co-coverage cells. In addition, when one of the cells is faulty, the terminal device can communicate with the network side by using the other cell, and the network side can still provide a service for the terminal device by using the normal cell. Therefore, it can be ensured that the service of the terminal device is not interrupted.

In a possible implementation, the terminal device communicates with the network side by using the first channel resource of the first cell or the second channel resource of the second cell. If the first cell or the second cell is abnormal, the terminal device reselects the other cell of the first cell and the second cell, and communicates with the network side by using the channel resource of the reselected cell.

For example, if the terminal device communicates with the network side by using the first channel resource of the first cell, when the first cell is abnormal, because the first cell and the second cell are the intra-frequency co-coverage cells, the terminal device reselects the second cell, to communicate with the network side. For example, if the terminal device communicates with the network side by using the second channel resource of the second cell, when the second cell is abnormal, because the first cell and the second cell are the intra-frequency co-coverage cells, the terminal device reselects the first cell, to communicate with the network side.

In this implementation, the terminal device may alternatively access only one of the two intra-frequency co-coverage cells. When the cell accessed by the terminal device is faulty, the terminal device can quickly reselect the other cell of the two intra-frequency co-coverage cells, to ensure that a service of the terminal device is not interrupted or a service of the terminal device is only delayed or interrupted for short time.

In this embodiment, the two intra-frequency co-coverage cells are established within the same frequency band, and time-frequency resources respectively used by the two cells are arranged in the time division or frequency division manner to avoid co-channel interference, so that the two cells back up each other. When one cell of the cells is abnormal, the other cell can still provide a service for the terminal device. Because the two cells share the frequency band, spectrum resources can be reduced, and consumption of bandwidth resources can be reduced. In addition, radio resource utilization can be improved while a reliability gain of dual-network system-level backup is obtained.

The following describes a specific distribution manner of the first channel resource and the second channel resource within the first frequency domain range.

Specifically, the first channel resource includes a data channel resource (referred to as a first data channel resource below) of the first cell and a control channel resource (referred to as a first control channel resource below) of the first cell, and the second channel resource includes a data channel resource (referred to as a second data channel resource below) of the second cell and a control channel resource (referred to as a second control channel resource below) of the second cell.

The first frequency domain range includes a second frequency domain range, the second frequency domain range is near a center frequency of the first frequency domain range, and the second frequency domain range is less than or equal to the first frequency domain range. A frequency domain resource within the second frequency domain range is used as a shared data channel resource, that is, the first data channel resource and the second data channel resource share the frequency domain resource within the second frequency domain range. Specifically, the first data channel resource and the second data channel resource are arranged within the second frequency domain range in the time division or frequency division manner.

It should be noted that a quantity of resources occupied by the first data channel resource is not necessarily the same as a quantity of resources occupied by the second data channel resource.

Figure 5A:
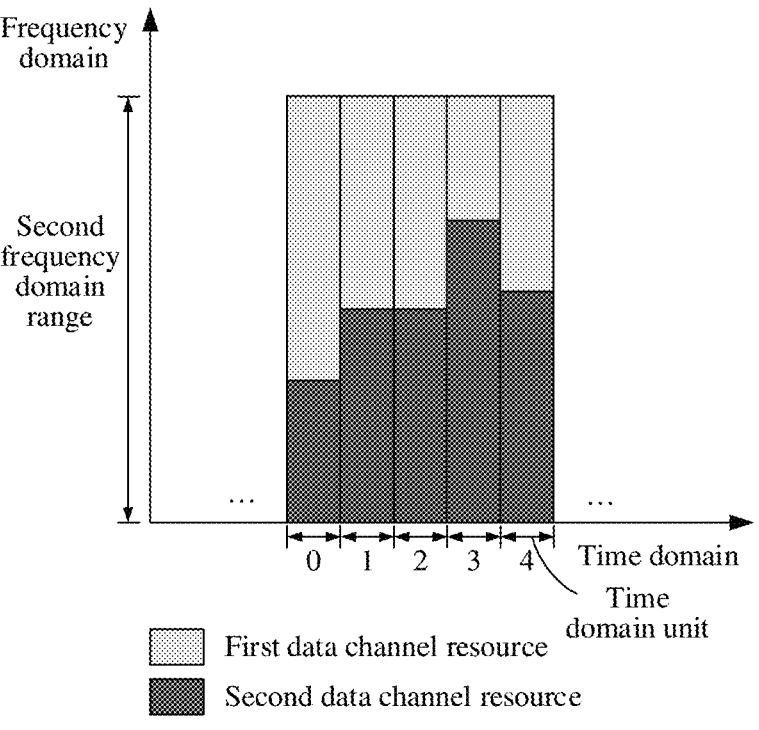
FIG. 5A is an example diagram of arranging data channel resources in a frequency division manner according to this application.

If the first data channel resource and the second data channel resource are arranged in the frequency division manner, in a same time domain unit, a quantity of subcarriers (or RBs) occupied by the first data channel resource in frequency domain is not necessarily the same as a quantity of subcarriers (or RBs) occupied by the second data channel resource in frequency domain. FIG. 5A is used as an example. In a time domain unit 0, a quantity of subcarriers occupied by the first data channel resource is greater than a quantity of subcarriers occupied by the second data channel resource; in a time domain unit 1, a quantity of subcarriers occupied by the first data channel resource is equal to a quantity of subcarriers occupied by the second data channel resource; and in a time domain unit 3, a quantity of subcarriers occupied by the first data channel resource is less than a quantity of subcarriers occupied by the second data channel resource. The time domain unit may be a slot, or may be a symbol.

Figure 5B:
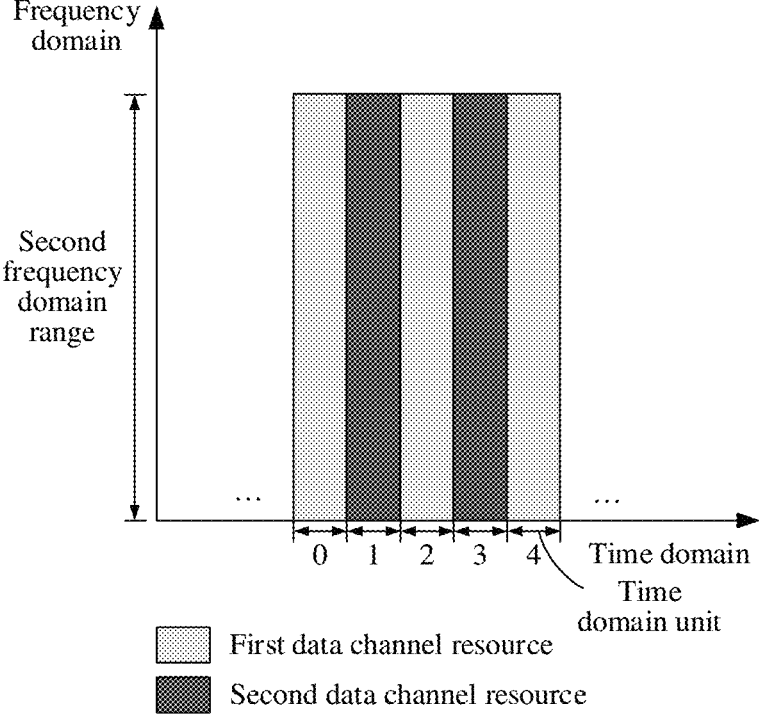
FIG. 5B is an example diagram of arranging data channel resources in a time division manner according to this application.

If the first data channel resource and the second data channel resource are arranged in the time division manner, a quantity of time domain units occupied by the first data channel resource in time domain is not necessarily the same as a quantity of time domain units occupied by the second data channel resource in time domain. The quantity of the time domain units may be a quantity of slots, or may be a quantity of symbols. For example, in a same slot, a quantity of symbols occupied by the first data channel resource is not necessarily the same as a quantity of symbols occupied by the second data channel resource. For another example, in a same subframe, a quantity of slots occupied by the first data channel resource is not necessarily the same as a quantity of slots occupied by the second data channel resource. FIG. 5B is used as an example. If a time domain unit in FIG. 5B is a symbol, the first data channel resource occupies three symbols: 0, 2, and 4, and the second data channel resource occupies only two symbols: 1 and 3.

Optionally, a quantity of resources occupied by the first data channel resource and a quantity of resources occupied by the second data channel resource may be dynamically adjusted. If the first data channel resource and the second data channel resource are arranged within the second frequency domain range in the frequency division manner, in different time domain units, quantities of resources occupied by the first data channel resource may be different. FIG. 5A is used as an example. Compared with a quantity of resources occupied by the first data channel resource in a previous time domain unit, a quantity of resources occupied by the first data channel resource in a current time domain unit is increased or decreased. Similarly, in different time domain units, quantities of resources occupied by the second data channel resource may also be different. FIG. 5A is used as an example. Compared with a quantity of resources occupied by the second data channel resource in a previous time domain unit, a quantity of resources occupied by the second data channel resource in a current time domain unit is increased or decreased. If the first data channel resource and the second data channel resource are arranged within the second frequency domain range in the time division manner, in two consecutive slots, a quantity of symbols occupied by the first data channel resource in a previous slot is not necessarily the same as a quantity of symbols occupied by the first data channel resource in a following slot.

Optionally, the network device may dynamically adjust, based on service information of the first cell and service information of the second cell, the quantity of the resources occupied by the first data channel resource and the quantity of the resources occupied by the second data channel resource. The service information includes service-related information such as a traffic volume and a service priority. For example, if a traffic volume of the first cell is greater than a traffic volume of the second cell, a larger resource between the data channel resources shared by the first cell and the second cell may be determined as the first data channel resource, and a smaller resource between the shared data channel resources may be determined as the second data channel resource. Similarly, if a traffic volume of the first cell is less than a traffic volume of the second cell, a smaller resource between the data channel resources shared by the first cell and the second cell may be determined as the first data channel resource, and a larger resource between the shared data channel resources may be determined as the second data channel resource. For example, if a service priority of the first cell is higher than a service priority of the second cell, a larger resource between the data channel resources shared by the first cell and the second cell may be determined as the first data channel resource, and a smaller resource between the shared data channel resources may be determined as the second data channel resource. Similarly, if a service priority of the first cell is lower than a service priority of the second cell, a smaller resource between the data channel resources shared by the first cell and the second cell may be determined as the first data channel resource, and a larger resource between the shared data channel resources may be determined as the second data channel resource. In addition, the traffic volume, the service priority, and other service-related information of the two cells may alternatively be comprehensively considered to determine a quantity of resources of the data channel resource scheduled by each cell. Details are not described herein.

In addition, the first control channel resource and the second control channel resource are arranged within the first frequency domain range in the frequency division manner. Specifically, the first control channel resource and the second control channel resource are equally arranged within the first frequency domain range in frequency domain, or the first control channel resource and the second control channel resource are located on two sides outside the second frequency domain range. Optionally, a quantity of resources occupied by the first control channel resource in frequency domain is the same as a quantity of resources occupied by the second control channel resource in frequency domain. Optionally, a quantity of time domain elements occupied by the first control channel resource in time domain is the same as a quantity of time domain elements occupied by the second control channel resource in frequency domain.

Specifically, if the first channel resource and the second channel resource are used for downlink scheduling, the first control channel resource includes a resource of a first physical downlink control channel PDCCH, the second control channel resource includes a resource of a second physical downlink control channel PDCCH, the first data channel resource includes a resource of a first physical downlink shared channel PDSCH, and the second data channel resource includes a resource of a second physical downlink shared channel PDSCH.

Figure 6A:
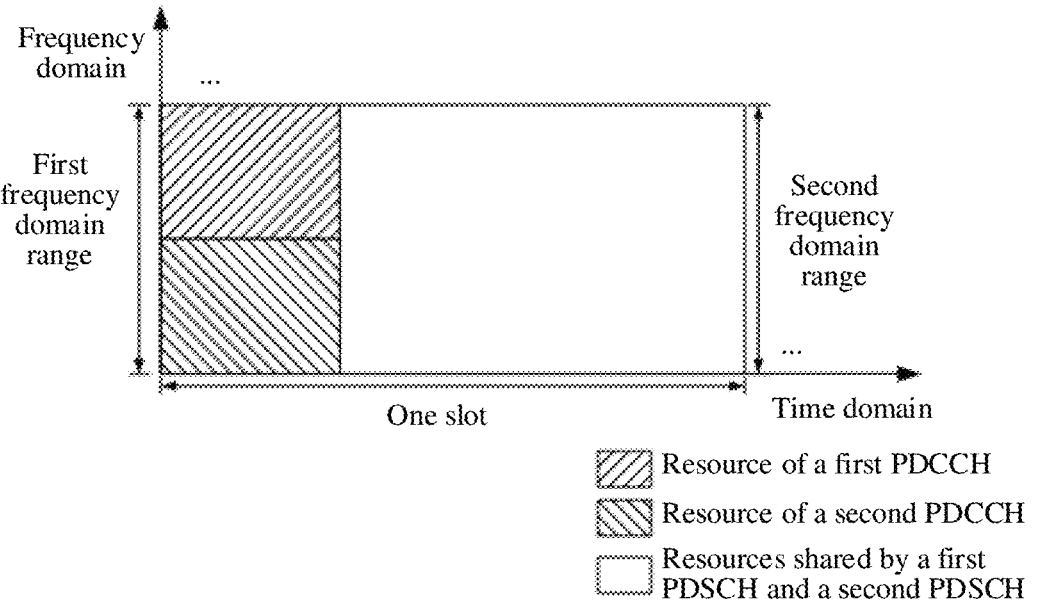
FIG. 6A is a schematic diagram of an embodiment of an arrangement manner of a control channel resource and a data channel resource in time-frequency domain that are used for downlink scheduling according to this application.

In this case, as shown in FIG. 6A, in a slot, a resource of a first PDCCH and a resource of a second PDCCH are equally arranged within a first frequency domain range in frequency domain, and the resource of the first PDCCH and the resource of the second PDCCH are located in first several symbols of the slot in time domain, and are located before symbols in which a resource of a first PDSCH and a resource of a second PDSCH are located. The resource of the first PDSCH and the resource of the second PDSCH share a frequency domain resource within a second frequency domain range in a frequency division or time division manner, and the second frequency domain range is equal to the first frequency domain range. Specifically, for a manner in which the first PDSCH and the second PDSCH share a frequency domain resource within the second frequency domain range, refer to the foregoing manner in which the first data channel resource and the second data channel resource share the resource within the second frequency domain range. Details are not described herein again.

Figure 6B:
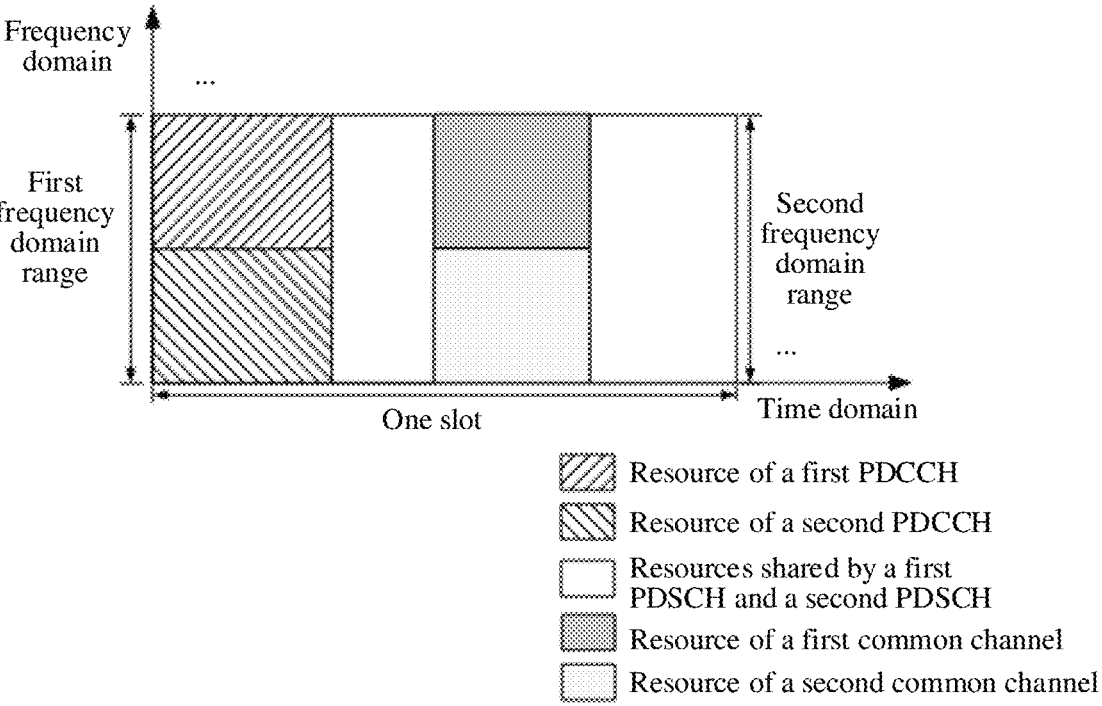
FIG. 6B is a schematic diagram of an embodiment of an arrangement manner of common channel resources in time-frequency domain that are used for downlink scheduling according to this application.

Optionally, as shown in FIG. 6B, in one slot, the first channel resource further includes a first common channel resource, and the second channel resource further includes a second common channel resource. The first common channel resource and the resource of the first PDCCH are located on same subcarriers and different symbols in a same slot, and the second common channel resource and the resource of the second PDCCH are located on same subcarriers and different symbols in a same slot. The first common channel resource and the second common channel resource may be in any several consecutive symbols in the resources shared by the first PDSCH and the second PDSCH.

In an optional implementation, the first common channel resource and the second common channel resource may be located in last several consecutive symbols in one slot. In this case, in the one slot, the resource of the first PDCCH and the resource of the second PDCCH are in the $1^{st}$ symbol, the resources shared by the first PDSCH and the second PDSCH are in middle several symbols, and the first common channel resource and the second common channel resource are in last several symbols.

In another optional implementation, the first common channel resource and the second common channel resource may be located in several consecutive symbols after the first PDCCH and the second PDCCH. In this case, in one slot, the resource of the first PDCCH and the resource of the second PDCCH are in the $1^{st}$ symbol, the first common channel resource and the second common channel resource are in middle several symbols, and the resources shared by the first PDSCH and the second PDSCH are in last several symbols.

In another optional implementation, the first common channel resource and the second common channel resource may be located in a middle part of the resources shared by the first PDSCH and the second PDSCH, that is, the resources shared by the first PDSCH and the second PDSCH are all in first several symbols and last several symbols before and after the first common channel resource and the second common channel resource.

In another optional implementation, in one slot, only the resource of the first PDCCH, the resource of the second PDCCH, the first common channel resource, and the second common channel resource may be included, that is, the first common channel resource and the second common channel resource are all in several symbols after the resource of the first PDCCH and the resource of the second PDCCH.

In this embodiment, the first common channel resource and the second common channel resource may be implemented in any one of the foregoing implementations.

In this embodiment, the first common channel resource and the second common channel resource may be implemented in a plurality of implementations.

In a possible implementation, the first common channel resource is a resource of a synchronization signal block SSB of the first cell, and the second common channel resource is a resource of a synchronization signal block SSB of the second cell.

Figure 6C:
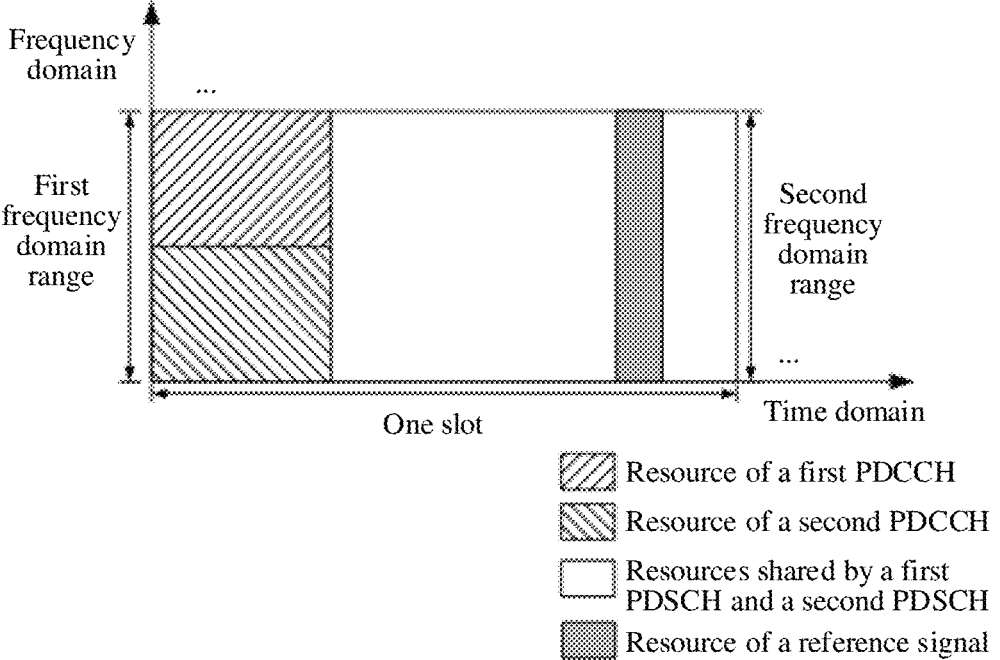
FIG. 6C is a schematic diagram of an embodiment of an arrangement manner of a resource of a reference signal in time-frequency domain that is used for downlink scheduling according to this application.
Figure 6D:
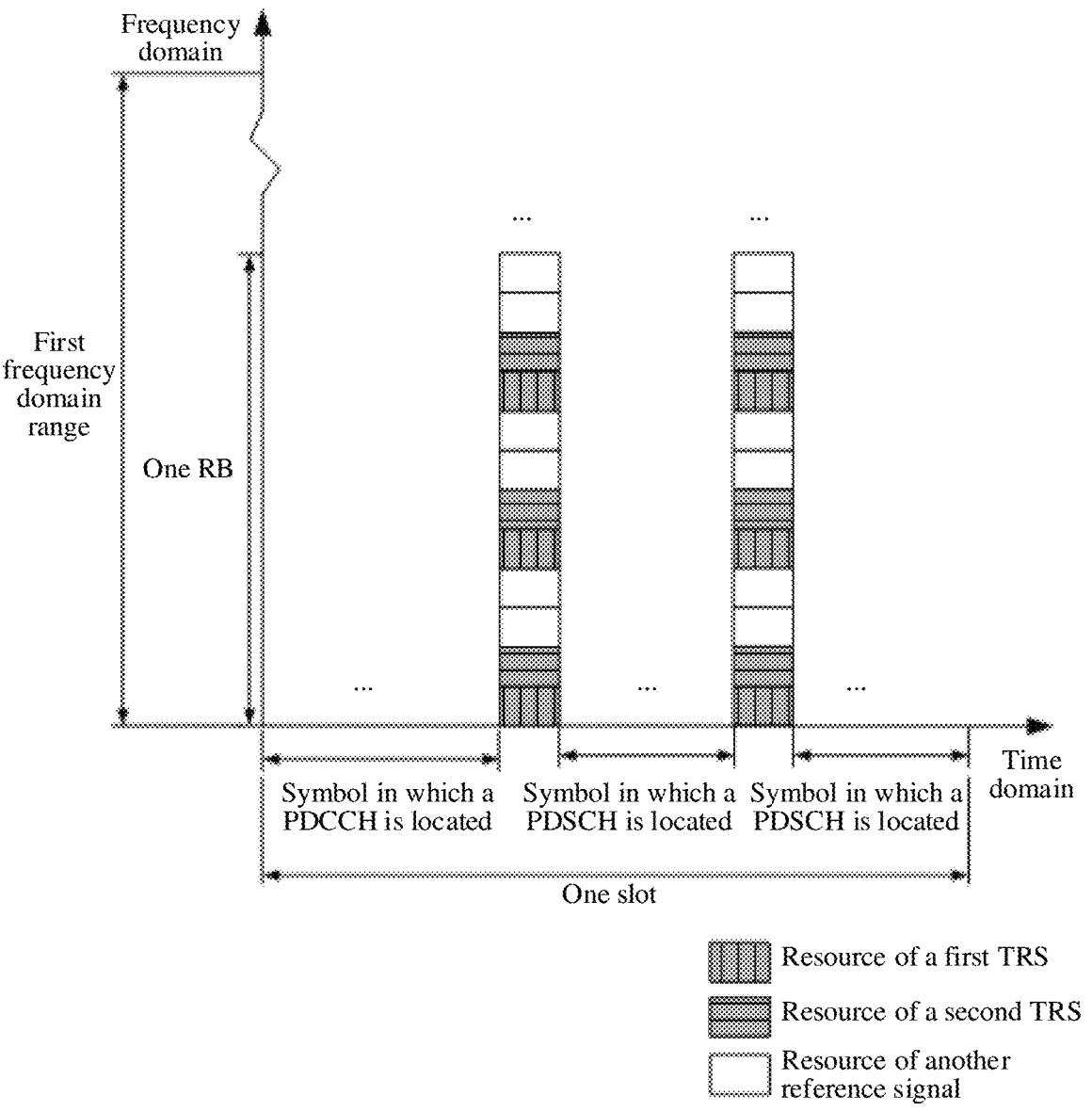
FIG. 6D is a schematic diagram of an embodiment of a resource of a TRS of a first cell and a resource of a TRS of a second cell according to this application.
Figure 6E:
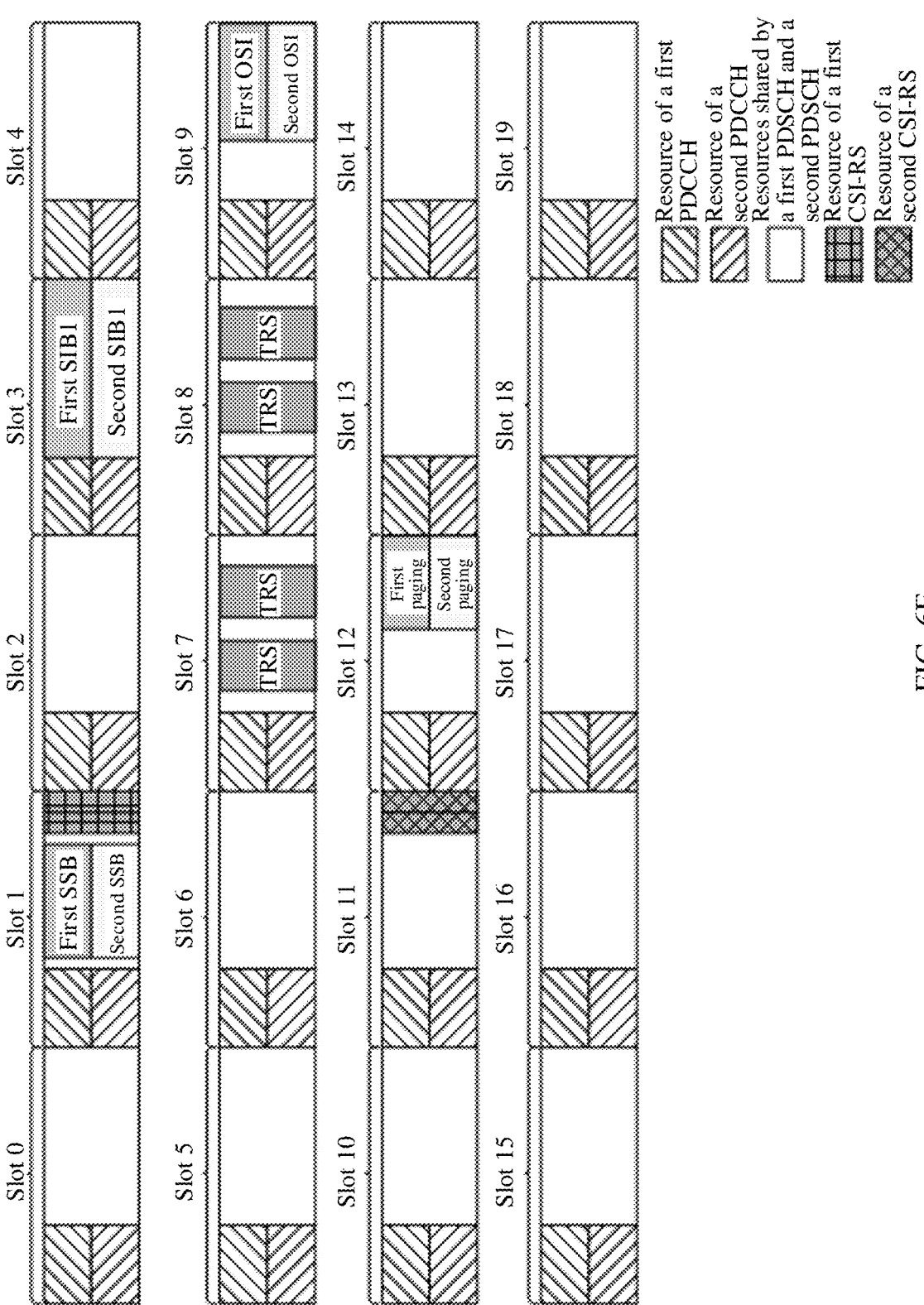
FIG. 6E is a possible example diagram of an arrangement manner of various channels in time-frequency domain when a first channel resource and a second channel resource are used for downlink scheduling according to this application.

For example, as shown in FIG. 6E, an arrangement manner of the resource of the SSB of the first cell and the resource of the SSB of the second cell within one slot may be shown in a slot 1. A resource of a first SSB is the resource of the SSB of the first cell, a resource of a second SSB is the resource of the SSB of the second cell, and the resource of the first SSB and the resource of the second SSB are located in a middle part of the resources shared by the first PDSCH and the second PDSCH, that is, the resources shared by the first PDSCH and the second PDSCH are all in first several symbols and last several symbols before and after the resource of the first SSB and the resource of the second SSB.

It should be understood that the resource of the SSB of the first cell and the resource of the SSB of the second cell may be located in several symbols after the first PDCCH and the second PDCCH, or may be located in the last several symbols in one slot. Details are not described herein.

It should be understood that the resource of the first SSB and the resource of the second SSB may alternatively be located in another slot. A slot in which the resource of the first SSB and the resource of the second SSB are specifically located is not limited in this application.

In another possible implementation, the first common channel resource is a resource of other system information (OSI) of the first cell, and the second common channel resource is a resource of other system information OSI of the second cell.

For example, as shown in FIG. 6E, an arrangement manner of the resource of the OSI of the first cell and the resource of the OSI of the second cell within one slot may be shown in a slot 9. A resource of first OSI is the resource of the OSI of the first cell, a resource of second OSI is the resource of the OSI of the second cell, and the resource of the first OSI and the resource of the second OSI are located in last several symbols of the slot 9.

It should be understood that the resource of the OSI of the first cell and the resource of the OSI of the second cell may be located in several symbols after the first PDCCH and the second PDCCH in one slot, or may be located in a middle part of the resources shared by the first PDSCH and the second PDSCH. Details are not described herein.

It should be understood that the resource of the first OSI and the resource of the second OSI may alternatively be located in another slot. A slot in which the resource of the first OSI and the resource of the second OSI are specifically located is not limited in this application.

In another possible implementation, the first common channel resource is a resource of system paging of the first cell, and the second common channel resource is a resource of system paging of the second cell.

For example, as shown in FIG. 6E, an arrangement manner of the resource of the system paging of the first cell and the resource of the system paging of the second cell within one slot may be shown in a slot 12. A resource of first paging is the resource of the system paging of the first cell, a resource of second paging is the resource of the system paging of the second cell, and the resource of the first paging and the resource of the second paging are located in last several symbols of the slot 12.

It should be understood that the resource of the system paging of the first cell and the resource of the system paging of the second cell may be located in several symbols after the first PDCCH and the second PDCCH in one slot, or may be located in a middle part of the resources shared by the first PDSCH and the second PDSCH. Details are not described herein.

It should be understood that the resource of the first paging and the resource of the second paging may alternatively be located in another slot. A slot in which the resource of the first paging and the resource of the second paging are specifically located is not limited in this application.

In another possible implementation, the first common channel resource is a resource of a system information block type 1 (SIB1) of the first cell, and the second common channel resource is a resource of a system information block type 1 SIB1 of the second cell. The resource of the SIB1 of the first cell and the resource of the SIB1 of the second cell are located in several symbols after the resource of the first PDCCH and the resource of the second PDCCH.

For example, as shown in FIG. 6E, an arrangement manner of the resource of the SIB1 of the first cell and the resource of the SIB1 of the second cell within one slot may be shown in a slot 3. A resource of a first SIB1 is the resource of the SIB1 of the first cell, a resource of a second SIB1 is the resource of the SIB1 of the second cell, and the resource of the first SIB1 and the resource of the second SIB1 are located in several symbols after the first PDCCH and the second PDCCH.

It should be understood that the resource of the first SIB1 and the resource of the second SIB1 may alternatively be located in another slot. A slot in which the resource of the first SIB1 and the resource of the second SIB1 are specifically located is not limited in this application.

Optionally, as shown in FIG. 6C, in a slot, in addition to control channel resources (for example, the resource of the first PDCCH and the resource of the second PDCCH) and data channel resources (for example, the resource of the first PDSCH and the resource of the second PDSCH), a resource of a reference signal is further included. The resource of the reference signal is located in one or more consecutive symbols in time domain in the resources shared by the first PDSCH and the second PDSCH, and is located in the second frequency domain range in frequency domain. The reference signal may be a channel state information-reference signal (CSI-RS) used to measure a downlink channel, or may be a tracking reference signal (TRS).

In a possible implementation, the reference signal is the CSI-RS. In this case, the first channel resource further includes a resource of a CSI-RS of the first cell, and the second channel resource further includes a resource of a CSI-RS of the second cell. The resource of the CSI-RS of the first cell and the resource of the CSI-RS of the second cell may be respectively located on same subcarriers and in different slots, or may be respectively located on same subcarriers and different symbols in a same slot.

For example, as shown in FIG. 6E, an arrangement manner of the resource of the CSI-RS of the first cell and the resource of the CSI-RS of the second cell in time-frequency domain may be shown in a slot 1 and a slot 11. A resource of a first CSI-RS is the resource of the CSI-RS of the first cell, a resource of a second CSI-RS is the resource of the CSI-RS of the second cell, the resource of the first CSI-RS is located in one or more symbols in the slot 1, the resource of the first CSI-RS crosses the entire second frequency domain range in frequency domain, the resource of the second CSI-RS is located in one or more symbols in the slot 11, and the resource of the second CSI-RS crosses the entire second frequency domain range in frequency domain.

In a possible implementation, the reference signal is the TRS. In this case, the first channel resource further includes a resource of a TRS of the first cell, and the second channel resource further includes a resource of a TRS of the second cell. The resource of the TRS of the first cell and the resource of the TRS of the second cell are respectively located on different subcarriers on a same symbol in a same slot. Optionally, both the resource of the TRS of the first cell and the resource of the TRS of the second cell may be included in one or more symbols in one slot. As shown in FIG. 6E, resources of TRSs in a slot 7 are the resource of the TRS of the first cell and the resource of the TRS of the second cell.

For example, as shown in FIG. 6D, one RB within the first frequency domain range is used as an example. In one symbol, the resource of the first TRS and the resource of the second TRS use different pattern identifiers. The resource pattern identifier of the first TRS indicates that the first TRS is located in REs whose index values are 0, 4, and 8 in one RB, and the resource pattern identifier of the second TRS indicates that the second TRS is located in REs whose index values are 1, 5, and 9 in one RB. Certainly, the resource of the first TRS and the resource of the second TRS may alternatively use other pattern identifiers. This is not specifically limited in this application. In addition, a symbol in which the resource of the first TRS and the resource of the second TRS are included is located after a symbol in which a PDCCH is located, and a symbol in which a PDSCH is located may exist between two symbols in which the resource of the first TRS and the resource of the second TRS are included.

It should be noted that in a conventional technology, a resource of a TRS of only one cell is in one symbol.

However, in this application, it is proposed that the resources of the TRSs of the two cells are disposed in one symbol, and the resources of the TRSs of the two cells use different pattern identifiers (that is, the resources of the TRSs of the two cells occupy different subcarriers in frequency domain). Therefore, more REs in a same symbol are used. Compared with the conventional technology, this application helps improve utilization of time-frequency resources.

It should be noted that when the first channel resource and the second channel resource are used for downlink scheduling, resources of various channels in the foregoing implementations may be respectively disposed in different slots of a subframe. As shown in FIG. 6E, an example in which one subframe includes 20 slots is used to list examples of the foregoing arrangement manners of various channel resources in time-frequency domain. In actual application, there are other similar examples, which are not listed one by one in this application.

Specifically, if the first channel resource and the second channel resource are used for uplink scheduling, the first control channel resource includes a resource of a first physical uplink control channel PUCCH, the second control channel resource includes a resource of a second physical uplink control channel PUCCH, the first data channel resource includes a resource of a first physical uplink shared channel PUSCH, and the second data channel resource includes a resource of a second physical uplink shared channel PUSCH.

Figure 7A:
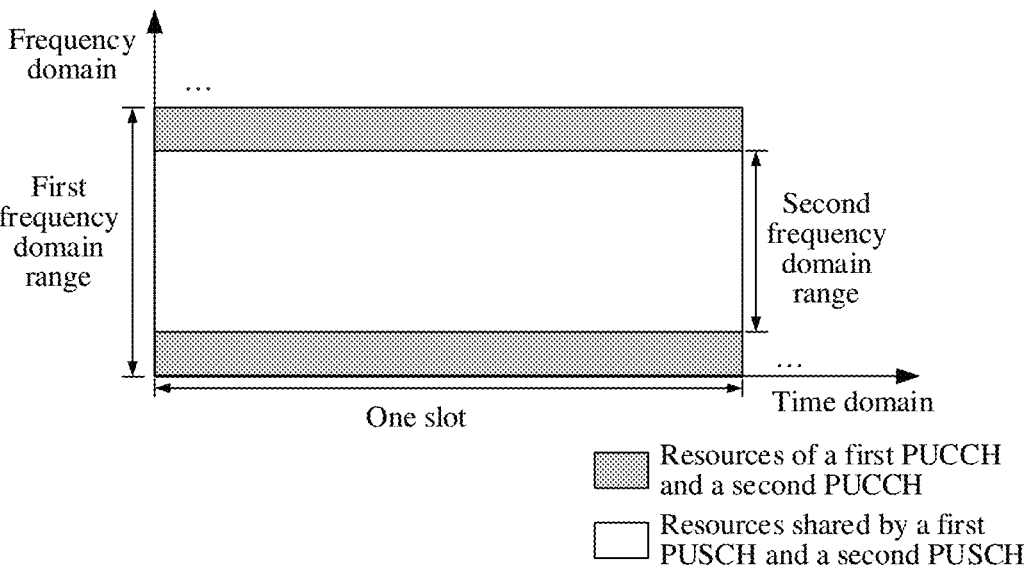
FIG. 7A is a schematic diagram of an embodiment of an arrangement manner of a control channel resource and a data channel resource in time-frequency domain that are used for uplink scheduling according to this application.

In this case, as shown in FIG. 7A, in one slot, the resource of the first PUCCH and the resource of the second PUCCH are located on two sides outside the second frequency domain range in frequency domain, and the second frequency domain range is less than the first frequency domain range. The resource of the first PUCCH and the resource of the second PUCCH are located in all symbols of the slot in time domain. The resource of the first PUSCH and the resource of the second PUSCH share a frequency domain resource within the second frequency domain range in the frequency division or time division manner. Specifically, for a manner in which the first PUSCH and the second PUSCH share a frequency domain resource within the second frequency domain range, refer to the foregoing manner in which the first data channel resource and the second data channel resource share the resource within the second frequency domain range. Details are not described herein again.

Figure 7B:
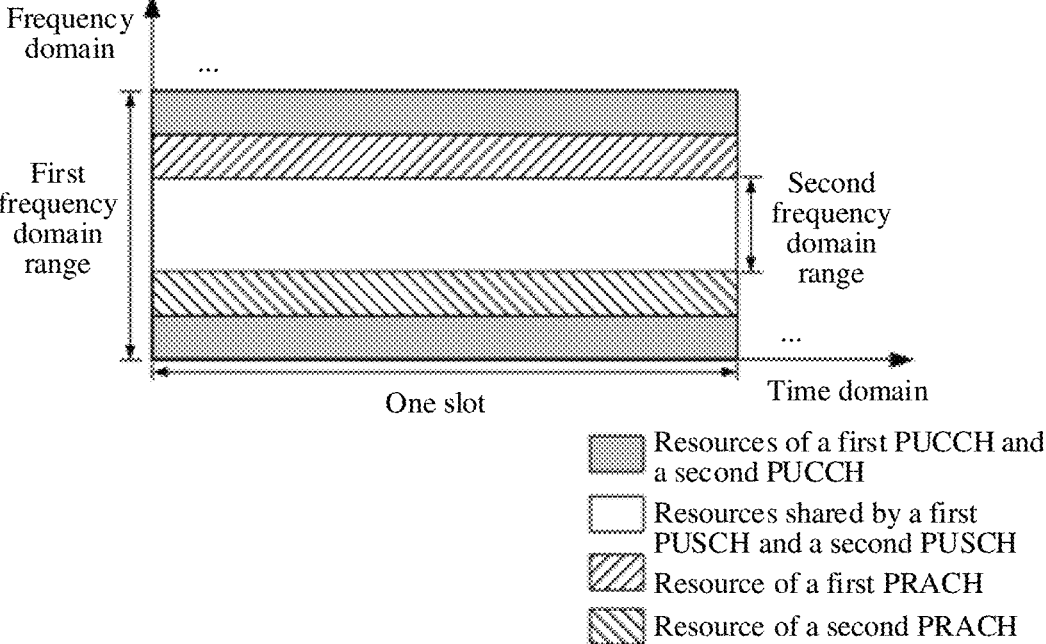
FIG. 7B is a schematic diagram of an embodiment of an arrangement manner of a first PRACH and a second PRACH in time-frequency domain according to this application.

Optionally, as shown in FIG. 7B, in one slot, the first channel resource includes a resource of a first random access channel PRACH, the second channel resource includes a resource of a second random access channel PRACH, the resource of the first PRACH is located on one side outside the second frequency domain range, and the resource of the second PRACH is located on the other side outside the second frequency domain range. Optionally, both the resource of the first PUCCH and the resource of the second PUCCH are located outside the resource of the first PRACH, and both the resource of the first PUCCH and the resource of the second PUCCH are located outside the resource of the second PRACH.

Figure 7C:
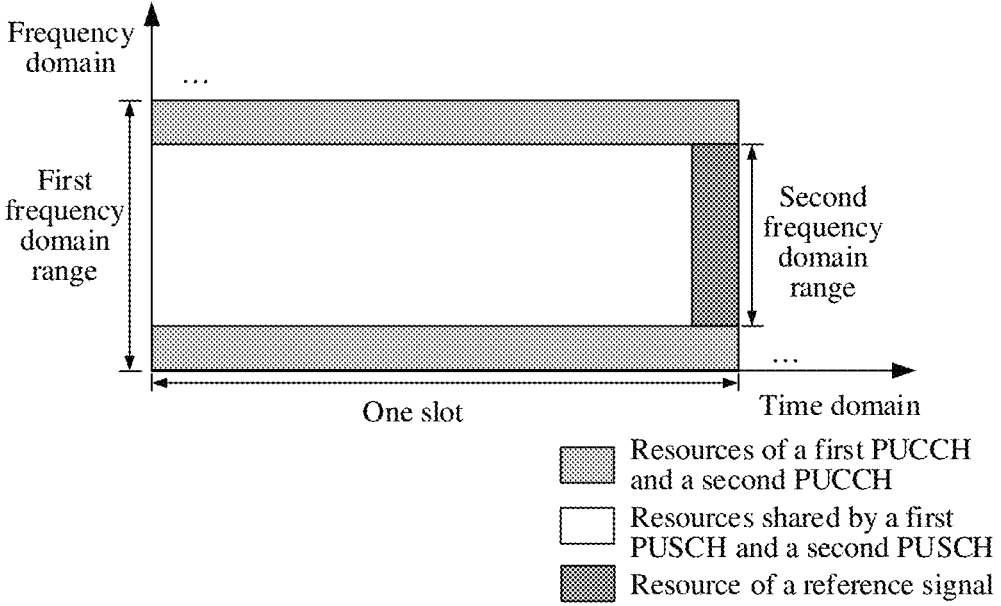
FIG. 7C is a schematic diagram of an embodiment of an arrangement manner of a resource of a reference signal in time-frequency domain that is used for uplink scheduling according to this application.

Optionally, as shown in FIG. 7C, in a slot, in addition to control channel resources (for example, the resource of the first PUCCH and the resource of the second PUCCH) and data channel resources (for example, the resource of the first PUSCH and the resource of the second PUSCH), a resource of a reference signal is further included. The resource of the reference signal is located in one or more consecutive symbols in time domain in the resources shared by the first PUSCH and the second PUSCH, and is located in the second frequency domain range in frequency domain. Optionally, the resources of the reference signals are located in last several consecutive symbols in one slot in time domain.

In a possible implementation, the reference signal may be a channel sounding reference signal (SRS) used to measure an uplink channel. In this case, the first channel resource further includes a resource of an SRS of the first cell, and the second channel resource further includes a resource of an SRS of the second cell. The resource of the SRS of the first cell and the resource of the SRS of the second cell may be respectively located on same subcarriers and in different slots, or may be respectively located on same subcarriers and different symbols in a same slot.

Figure 7D:
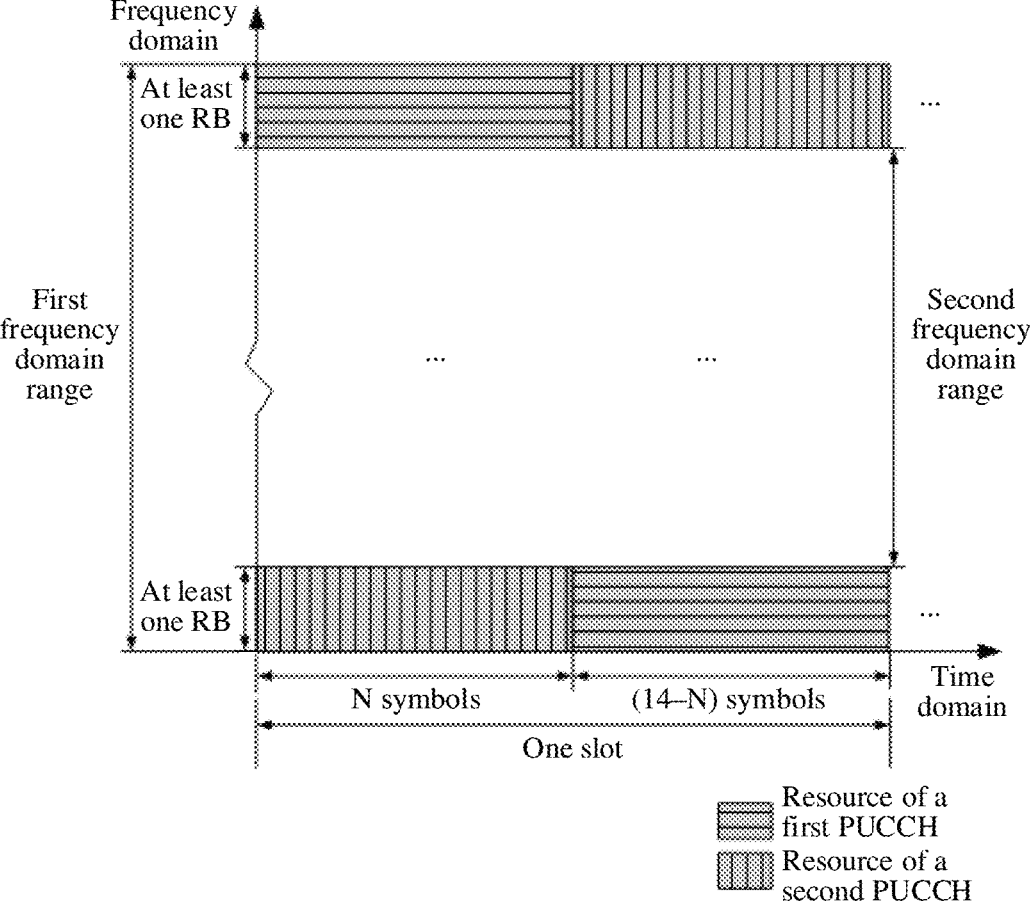
FIG. 7D is a schematic diagram of an embodiment of an arrangement manner of a resource of a first PUCCH and a resource of a second PUCCH in time-frequency domain according to this application.
Figure 7E:
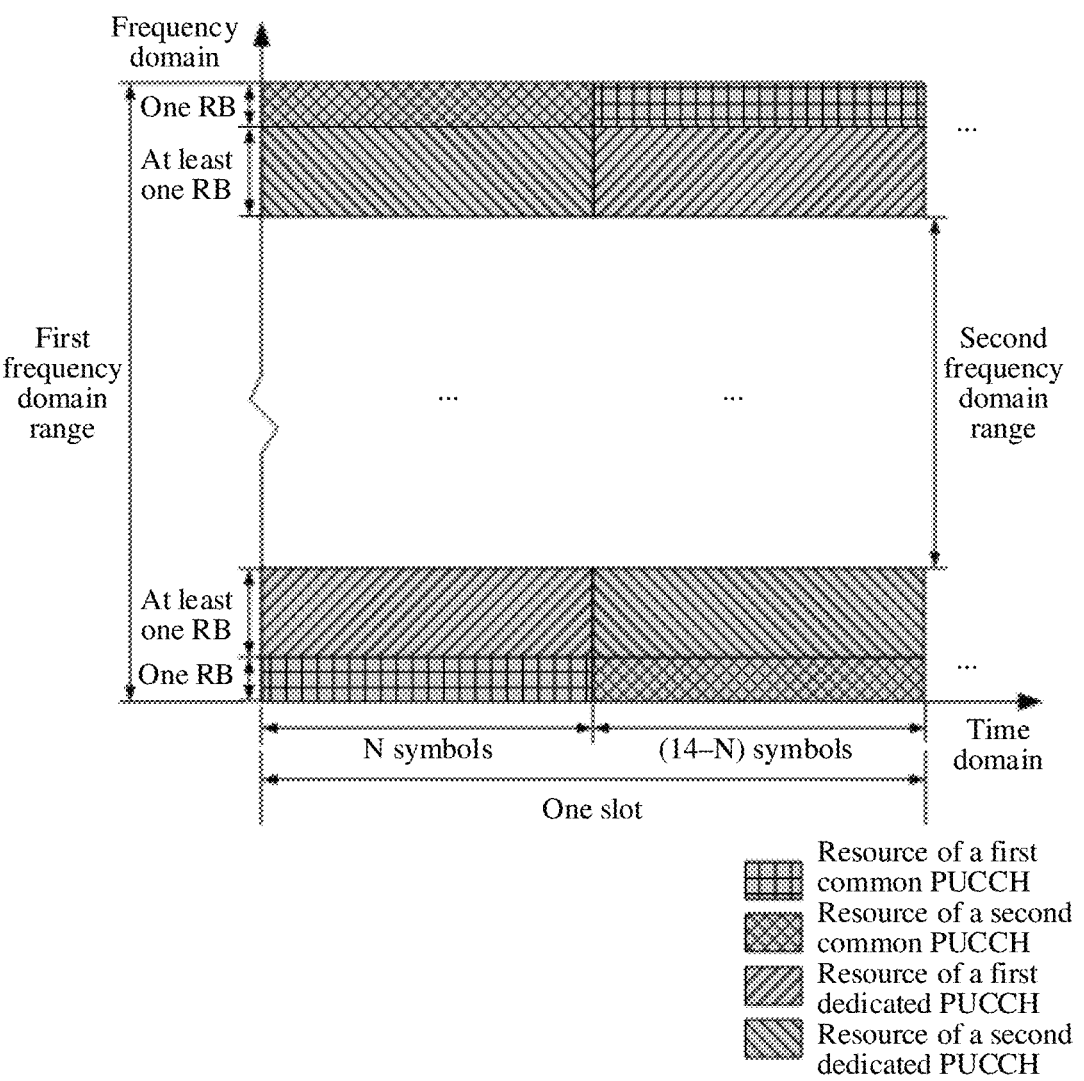
FIG. 7E is a schematic diagram of another embodiment of an arrangement manner of a resource of a first PUCCH and a resource of a second PUCCH in time-frequency domain according to this application.
Figure 7F:
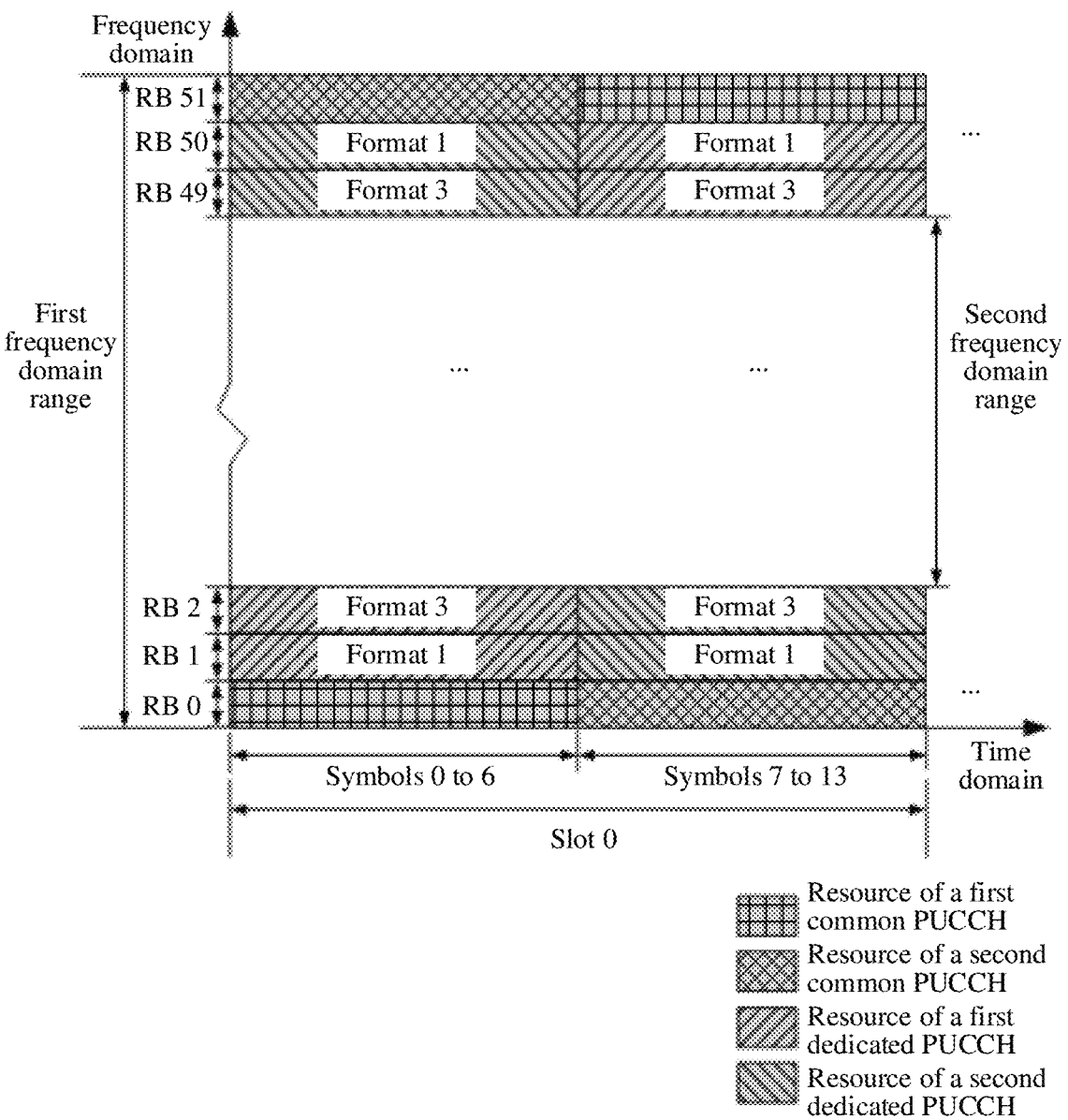
FIG. 7F is a possible example diagram of an arrangement manner of a resource of a first PUCCH and a resource of a second PUCCH in time-frequency domain according to this application.
Figure 7G:
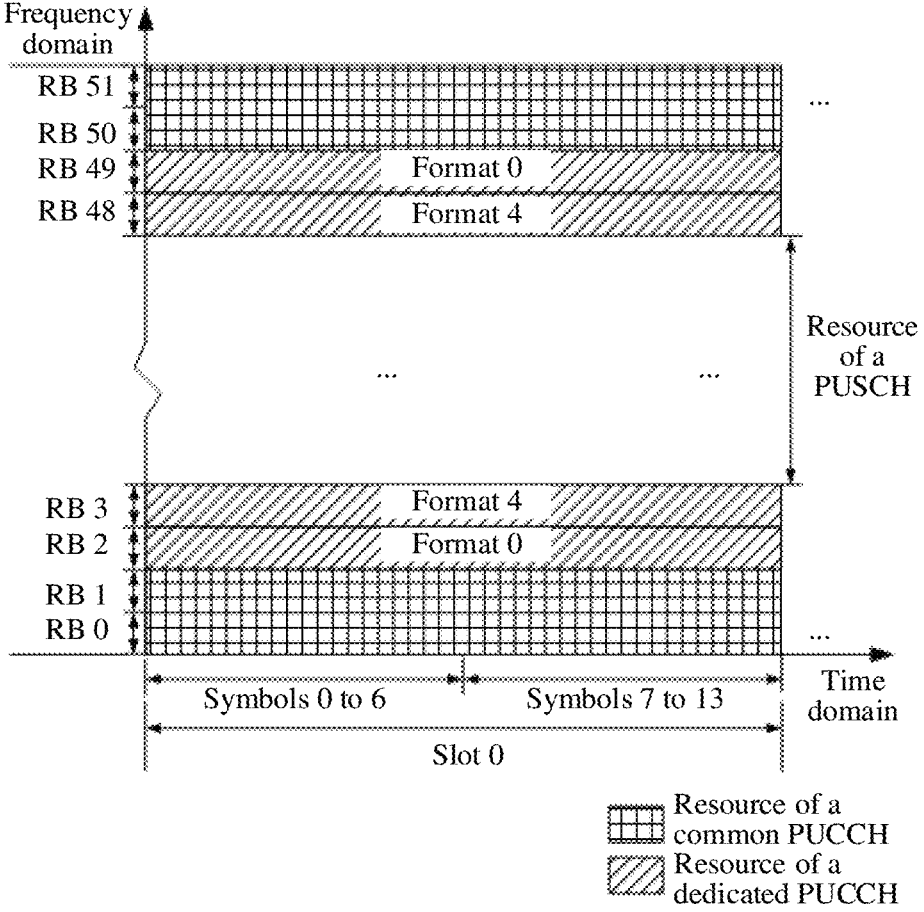
FIG. 7G is a possible example diagram of an arrangement manner of a resource of a common PUCCH and a resource of a PUCCH in a dedicated format in time-frequency domain in a conventional technology.
Figure 7H:
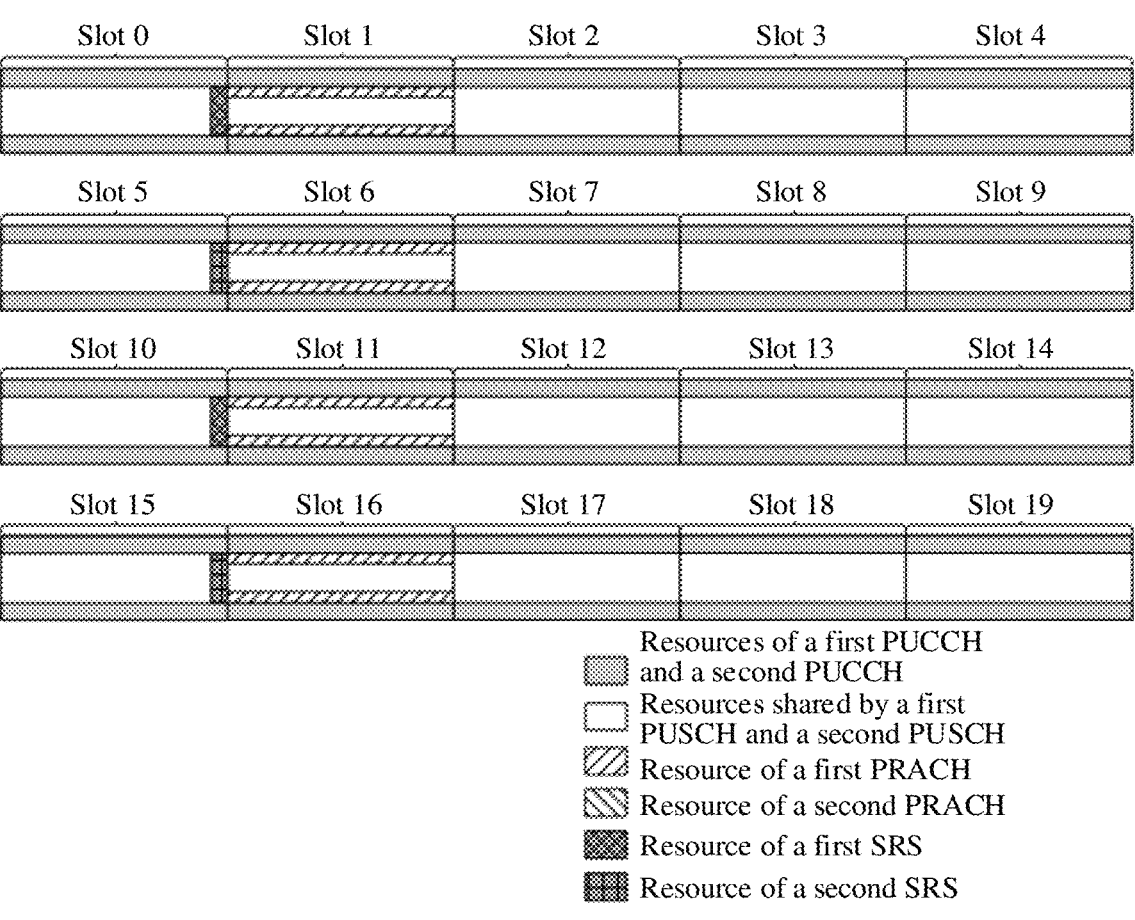
FIG. 7H is a possible example diagram of an arrangement manner of various channels in time-frequency domain when a first channel resource and a second channel resource are used for uplink scheduling according to this application.

For example, as shown in FIG. 7H, an arrangement manner of the resource of the SRS of the first cell and the resource of the SRS of the second cell in time-frequency domain may be shown in a slot 0 and a slot 5. A resource of a first SRS is the resource of the SRS of the first cell, a resource of a second SRS is the resource of the SRS of the second cell, the resource of the first SRS is located in one or more symbols in the slot 0 (for example, the resource of the first SRS is located in last one or more symbols in the slot 0), and the resource of the first SRS crosses the entire second frequency domain range in frequency domain; and a resource of a second SRS is located in one or more symbols in the slot 5 (for example, the resource of the second SRS is located in last one or more symbols in the slot 5), and the resource of the second SRS crosses the entire second frequency domain range in frequency domain.

The following describes in detail, with reference to FIG. 7D, FIG. 7E, and FIG. 7F, an arrangement manner of the resource of the first PUCCH and the resource of the second PUCCH in time-frequency domain in this application.

In this embodiment, on any side outside the second frequency domain range, the resource of the first PUCCH and the resource of the second PUCCH occupy same subcarriers in frequency domain, and occupy different time domain units in time domain. In a same time domain unit, the resource of the first PUCCH and the resource of the second PUCCH are respectively located on the two sides outside the second frequency domain range.

Specifically, FIG. 7D is used as an example. Within the first frequency domain range and on any side outside the second frequency domain range, the resource of the first PUCCH and the resource of the second PUCCH may occupy at least one RB in frequency domain, and the resource of the first PUCCH and the resource of the second PUCCH each occupy one or more symbols in time domain. Optionally, the resource of the first PUCCH and the resource of the second PUCCH occupy one complete slot in time domain. For example, if the resource of the first PUCCH occupies N symbols in time domain, the resource of the second PUCCH occupies (14−N) symbols in time domain. In a same symbol, if the resource of the first PUCCH is on one side outside the second frequency domain range, the resource of the second PUCCH is on the other side outside the second frequency domain range. For example, in the first N symbols in the slot shown in FIG. 7D, the resource of the first PUCCH is located on a side on which the RB has a larger index value, and the resource of the second PUCCH is located on a side on which the RB has a smaller index value. In the last (14−N) symbols in the slot shown in FIG. 7D, the resource of the first PUCCH is located on a side on which the RB has a smaller index value, and the resource of the second PUCCH is located on a side on which the RB has a larger index value.

In addition, the resource of the PUCCH may specifically include a resource of a common PUCCH and a resource of a PUCCH in at least one dedicated format.

As shown in FIG. 7E, the resource of the first PUCCH includes a resource of a first common PUCCH (namely, the resource of the common PUCCH of the first cell), the resource of the second PUCCH includes a resource of a second common PUCCH (namely, the resource of the common PUCCH of the second cell), and the resource of the first common PUCCH and the resource of the second common PUCCH are located on the two sides outside and away from the second frequency domain range.

Optionally, the resource of the first common PUCCH and the resource of the second common PUCCH occupy a same resource block RB in frequency domain. On any side outside the second frequency domain range, the resource of the first common PUCCH and the resource of the second common PUCCH occupy same subcarriers in frequency domain, and occupy different time domain units in time domain. In a same time domain unit, the resource of the first common PUCCH and the resource of the second common PUCCH are respectively located on the two sides outside the second frequency domain range.

In this implementation, the common PUCCHs of the two cells are compressed in different symbols of one RB for sending, that is, the resources of the common PUCCHs of the two cells are disposed in the different symbols of the same RB. However, in a conventional technology, because the resources of the PUCCHs of different cells are located in different frequency bands, the resources of the PUCCHs of the two cells need to occupy two different RBs. Therefore, compared with a solution in the conventional technology, this implementation can help improve utilization efficiency of time-frequency resources by disposing the resources of the common PUCCHs of the two cells in one RB.

Optionally, as shown in FIG. 7E, in one slot, in addition to the resource of the common PUCCH, a same cell may further include a resource of a PUCCH in one or more dedicated formats. For example, the PUCCH in the dedicated format may be any one of a PUCCH in a format 0, a PUCCH in a format 1, a PUCCH in a format 2, a PUCCH in a format 3, and a PUCCH in a format 4.

In addition, the resource of the PUCCH in the dedicated format is located on an inner side between the resource of the first common PUCCH and the resource of the second common PUCCH. In one slot, for a same cell, a resource of a PUCCH in each dedicated format and the common PUCCH resource occupy different subcarriers in frequency domain and occupy same symbols in time domain. A resource of a PUCCH in each dedicated format may occupy one or more RBs. This is not specifically limited herein.

For ease of understanding, FIG. 7F is used as an example. Assuming that the first frequency domain range includes a total of 52 RBs from 0 to 51, and one of the resource of the first PUCCH and the resource of the second PUCCH occupies six RBs in frequency domain, the second frequency domain range includes remaining 46 RBs. If the resource of the first PUCCH and the resource of the second PUCCH further include resources in two dedicated formats: a format 1 and a format 3 in addition to the resources of the common PUCCHs, the resource of the first common PUCCH and the resource of the second PUCCH occupy RBs (namely, an RB 0 and an RB 51) whose index values are 0 and 51, the resources of the PUCCHs in the dedicated formats of the first cell and the resources of the PUCCHs in the dedicated formats of the second cell occupy RBs (namely, an RB 1, an RB 2, an RB 49, and an RB 50) whose index values are 1, 2, 49, and 50. The resource of the first common PUCCH occupies first seven symbols (namely, a symbol 0 to a symbol 6) of the RB 0 and last seven symbols (namely, a symbol 7 to a symbol 13) of the RB 51, and the resource of the second common PUCCH occupies last seven symbols (namely, the symbol 7 to the symbol 13) of the RB 0 and first seven symbols (namely, the symbol 0 to the symbol 6) of the RB 51. A resource of a PUCCH in the format 1 of the first cell occupies first seven symbols (namely, a symbol 0 to a symbol 6) of the RB 1 and last seven symbols (namely, a symbol 7 to a symbol 13) of the RB 50, and a resource of a PUCCH in the format 1 of the second cell occupies last seven symbols (namely, a symbol 7 to a symbol 13) of the RB 1 and first seven symbols (namely, a symbol 0 to a symbol 6) of the RB 50. A resource of a PUCCH in the format 3 of the first cell occupies first seven symbols (namely, a symbol 0 to a symbol 6) of the RB 1 and last seven symbols (namely, a symbol 7 to a symbol 13) of the RB 50, and a resource of a PUCCH in the format 3 of the second cell occupies last seven symbols (namely, a symbol 7 to a symbol 13) of the RB 1 and first seven symbols (namely, a symbol 0 to a symbol 6) of the RB 50.

It should be understood that FIG. 7F is merely an example of this implementation. In actual application, other examples of resources of common PUCCHs and resources of PUCCHs in various dedicated formats may be listed based on the foregoing implementations. Details are not listed one by one in this application.

It should be understood that in a conventional technology, one RB includes only a resource of a PUCCH of one cell. FIG. 7G shows an arrangement manner of PUCCHs in a conventional technology. In an example shown in FIG. 7G, only a resource of a PUCCH of one cell is included in this slot, and a resource of a common PUCCH needs to occupy at least two RBs. However, resources of common PUCCHs of two cells may be disposed in one RB in the arrangement manner of the resources of the PUCCHs in this application. Therefore, this helps improve resource utilization.

It should be noted that when the first channel resource and the second channel resource are used for uplink scheduling, resources of various channels in the foregoing implementations may be respectively disposed in different slots of a subframe. As shown in FIG. 7H, an example in which one subframe includes 20 slots is used to list examples of the foregoing arrangement manners of various channel resources in time-frequency domain. In actual application, there are other similar examples, which are not listed one by one in this application.

Figure 8:
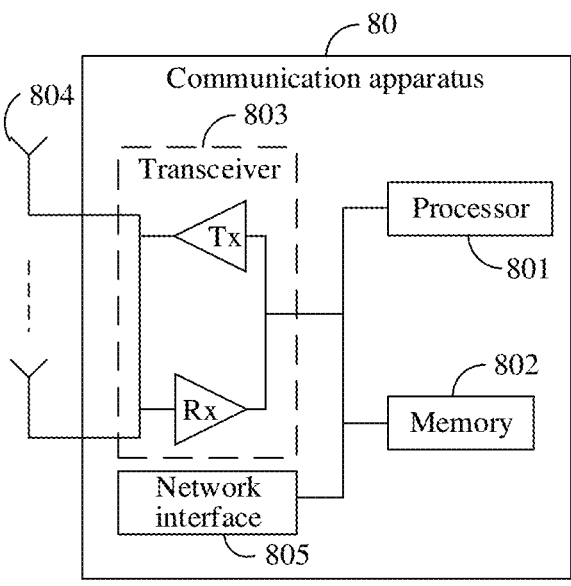
FIG. 8 is a schematic diagram of an embodiment of a communication apparatus according to this application.

FIG. 8 is a schematic diagram of a structure of another communication apparatus 80 according to an embodiment. It should be understood that the network device (for example, the first network device or the second network device) in the method embodiment corresponding to FIG. 1 may be implemented based on the structure of the communication apparatus 80 shown in FIG. 8 in this embodiment. It should be further understood that when performing the method in embodiments of this application, a network device (for example, an access network device or a base station) of a subsequent evolved standard may also use the structure of the communication apparatus 80 shown in FIG. 8 in this embodiment.

The communication apparatus 80 includes at least one processor 801, at least one memory 802, at least one transceiver 803, at least one network interface 805, and one or more antennas 804. The processor 801, the memory 802, the transceiver 803, and the network interface 805 are connected via a connection apparatus, and the antenna 804 is connected to the transceiver 803. The connection apparatus may include various types of interfaces, transmission cables, buses, or the like. This is not limited in this embodiment.

The memory 802 is mainly configured to store a software program and data. The memory 802 may exist independently, and is connected to the processor 801. Optionally, the memory 802 may be integrated with the processor 801, for example, is integrated into one or more chips. The memory 802 can store program code for executing the technical solutions in embodiments of this application, and the processor 801 controls the execution. Various types of executed computer program code may also be considered as drivers of the processor 801. It should be understood that FIG. 8 in this embodiment shows only one memory and one processor. However, in actual application, the communication apparatus 80 may include a plurality of processors or a plurality of memories. This is not specifically limited herein. In addition, the memory 802 may also be referred to as a storage medium, a storage device, or the like. The memory 802 may be a storage element (namely, an on-chip storage element) located on a same chip as the processor, or an independent storage element. This is not limited in this embodiment of this application.

In this embodiment, the transceiver 803 may be configured to support receiving or sending of a radio frequency signal between the communication apparatus 80 and a terminal device, and the transceiver 803 may be connected to the antenna 804. The transceiver 803 includes a transmitter machine (Tx) and a receiver machine (Rx). Specifically, the one or more antennas 804 may receive the radio frequency signal. The receiver machine Rx in the transceiver 803 is configured to: receive the radio frequency signal from the antenna 804, convert the radio frequency signal into a digital baseband signal or a digital intermediate frequency signal, and provide the digital baseband signal or the digital intermediate frequency signal for the processor 801, so that the processor 801 further processes the digital baseband signal or the digital intermediate frequency signal, for example, performs demodulation processing and decoding processing. In addition, the transmitter machine Tx of the transceiver 803 is further configured to: receive a modulated digital baseband signal or digital intermediate frequency signal from the processor 801, convert the modulated digital baseband signal or digital intermediate frequency signal into a radio frequency signal, and send the radio frequency signal through the one or more antennas 804. Specifically, the receiver machine Rx may selectively perform one or more levels of down-mixing processing and analog-to-digital conversion processing on the radio frequency signal to obtain the digital baseband signal or the digital intermediate frequency signal, and a sequence of the down-mixing processing and the analog-to-digital conversion processing is adjustable. The transmitter machine Tx may selectively perform one or more levels of up-mixing processing and digital-to-analog conversion processing on the modulated digital baseband signal or digital medium-frequency signal to obtain the radio frequency signal. A sequence of the up-mixing processing and the digital-to-analog conversion processing is adjustable. The digital baseband signal and the digital intermediate frequency signal may be collectively referred to as a digital signal.

It should be understood that the transceiver 803 may alternatively be referred to as a transceiver unit, a transceiver machine, a transceiver apparatus, or the like. Optionally, a device that is in the transceiver unit and that is configured to implement a receiving function may be considered as a receiving unit. A device that is in the transceiver unit and that is configured to implement a sending function may be considered as a sending unit. That is, the transceiver unit includes the receiving unit and the sending unit. The receiving unit may also be referred to as a receiver machine, an input port, a receiving circuit, or the like. The sending unit may be referred to as a transmitter machine, a transmitter, a transmitting circuit, or the like.

In addition, the processor 801 is mainly configured to: process a communication protocol and communication data, control an entire network device, execute a software program, and process data of the software program, for example, is configured to support the communication apparatus 80 in performing an action described in the foregoing embodiments. The communication apparatus 80 may include a baseband processor and a central processing unit. The baseband processor is mainly configured to process a communication protocol and communication data, and the central processing unit is mainly configured to: control the entire communication apparatus 80, execute a software program, and process data of the software program. The processor 801 in FIG. 8 may integrate functions of the baseband processor and the central processing unit. Persons skilled in the art may understand that the baseband processor and the central processing unit may alternatively be independent processors, and are interconnected by using a technology such as a bus. Persons skilled in the art may understand that the communication apparatus 80 may include a plurality of baseband processors to adapt to different network standards, the communication apparatus 80 may include a plurality of central processing units to enhance a processing capability of the communication apparatus 80, and components of the communication apparatus 80 may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

In addition, the network interface 805 is configured to enable the communication apparatus 80 to be connected to another communication apparatus over a communication link. Specifically, the network interface 805 may include a network interface between the communication apparatus 80 and a core network element, for example, an S1 interface. The network interface 805 may alternatively include a network interface between the communication apparatus 80 and another network device (for example, another access network device or core network element), for example, an X2 or an Xn interface.

In a possible implementation, the communication apparatus 80 is configured to perform the method in the embodiment corresponding to FIG. 1. Specifically, in the communication apparatus 80, the processor 801 is configured to obtain information about a first channel resource of a first cell. Optionally, the processor 801 is configured to obtain information about a second channel resource of a second cell. The processor 801 communicates with the terminal device via the transceiver 803 by using the information about the first channel resource of the first cell and the information about the second channel resource of the second cell.

The first cell and the second cell are intra-frequency co-coverage cells of each other. Optionally, the first cell and the second cell use a same standard. The information about the first channel resource of the first cell indicates a time-frequency domain position of the channel resource of the first cell, and the information about the second channel resource of the second cell indicates a time-frequency domain position of the channel resource of the second cell. The channel resource (namely, a first channel resource) of the first cell and the channel resource (namely, a second channel resource) of the second cell are arranged within the foregoing first frequency domain range in a time division or frequency division manner, that is, the first channel resource and the second channel resource are arranged in an overlapping part of system bandwidths of the first cell and the second cell in the time division or frequency division manner, so that time-frequency resources are reduced while co-channel interference is avoided.

In an optional implementation, the processor 801 may first obtain the information about the second channel resource, and then determine the information about the first channel resource based on the information about the second channel resource.

In an optional implementation, the processor 801 may further obtain service information of the first cell and service information of the second cell; and determine, based on the service information of the first cell and the service information of the second cell, a quantity of resources occupied by the first data channel resource in frequency domain or a quantity of time domain units occupied by the first data channel resource in time domain. The service information includes service-related information such as a traffic volume and a service priority.

Optionally, the first frequency domain range includes a second frequency domain range, the second frequency domain range is near a center frequency of the first frequency domain range, and the second frequency domain range is less than or equal to the first frequency domain range. The first channel resource includes a first data channel resource, the second channel resource includes a second data channel resource, and the first data channel resource and the second data channel resource are arranged within the second frequency domain range in the time division or frequency division manner.

For other parts, refer to the method performed by the network device in the foregoing embodiment. Details are not described herein again.

Figure 9:
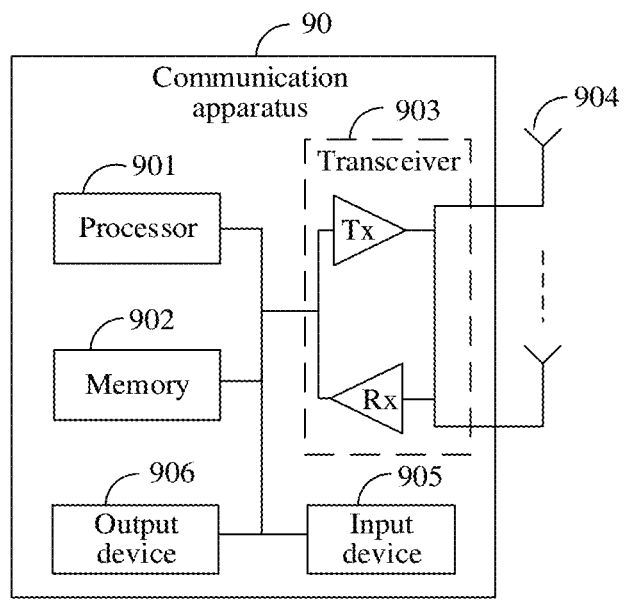
FIG. 9 is a schematic diagram of another embodiment of a communication apparatus according to this application.

FIG. 9 is a schematic diagram of a structure of a communication apparatus 90 according to an embodiment. It should be understood that the terminal device in the method embodiment corresponding to FIG. 1 may be implemented based on the structure of the communication apparatus 90 shown in FIG. 9 in this embodiment.

The communication apparatus 90 includes at least one processor 901, at least one memory 902, and at least one transceiver 903. The processor 901, the memory 902, and the transceiver 903 are connected. Optionally, the communication apparatus 90 may further include an input device 905, an output device 906, and one or more antennas 904. The antenna 904 is connected to the transceiver 903, and the input device 905 and the output device 906 are connected to the processor 901.

In this embodiment, the memory 902 is mainly configured to store a software program and data. The memory 902 may exist independently, and is connected to the processor 901. Optionally, the memory 902 may be integrated with the processor 901, for example, integrated into one or more chips. The memory 902 can store program code for executing the technical solutions in embodiments of this application, and the processor 901 controls the execution. Various types of executed computer program code may also be considered as drivers of the processor 901. It should be understood that FIG. 9 in this embodiment shows only one memory and one processor. However, in actual application, the communication apparatus 90 may include a plurality of processors or a plurality of memories. This is not specifically limited herein. In addition, the memory 902 may also be referred to as a storage medium, a storage device, or the like. The memory 902 may be a storage element (namely, an on-chip storage element) located on a same chip as the processor, or an independent storage element. This is not limited in this embodiment of this application.

In this embodiment, the transceiver 903 may be configured to support receiving or sending of a radio frequency signal between the communication apparatus 90 and an access network device, and the transceiver 903 may be connected to the antenna 904. The transceiver 903 includes a transmitter machine Tx and a receiver machine Rx. Specifically, the one or more antennas 904 may receive the radio frequency signal. The receiver machine Rx in the transceiver 903 is configured to: receive the radio frequency signal from the antenna 904, convert the radio frequency signal into a digital baseband signal or a digital intermediate frequency signal, and provide the digital baseband signal or the digital intermediate frequency signal for the processor 901, so that the processor 901 further processes the digital baseband signal or the digital intermediate frequency signal, for example, performs demodulation processing and decoding processing. In addition, the transmitter machine Tx of the transceiver 903 is further configured to: receive a modulated digital baseband signal or digital intermediate frequency signal from the processor 901, convert the modulated digital baseband signal or digital intermediate frequency signal into a radio frequency signal, and send the radio frequency signal through the one or more antennas 904. Specifically, the receiver machine Rx may selectively perform one or more levels of down-mixing processing and analog-to-digital conversion processing on the radio frequency signal to obtain the digital baseband signal or the digital intermediate frequency signal, and a sequence of the down-mixing processing and the analog-to-digital conversion processing is adjustable. The transmitter machine Tx may selectively perform one or more levels of up-mixing processing and digital-to-analog conversion processing on the modulated digital baseband signal or digital medium-frequency signal to obtain the radio frequency signal. A sequence of the up-mixing processing and the digital-to-analog conversion processing is adjustable. The digital baseband signal and the digital intermediate frequency signal may be collectively referred to as a digital signal.

It should be understood that the transceiver 903 may alternatively be referred to as a transceiver unit, a transceiver machine, a transceiver apparatus, or the like. Optionally, a device that is in the transceiver unit and that is configured to implement a receiving function may be considered as a receiving unit. A device that is in the transceiver unit and that is configured to implement a sending function may be considered as a sending unit. That is, the transceiver unit includes the receiving unit and the sending unit. The receiving unit may also be referred to as a receiver machine, an input port, a receiving circuit, or the like. The sending unit may be referred to as a transmitter machine, a transmitter, a transmitting circuit, or the like.

The processor 901 may be a baseband processor, or may be a central processing unit (CPU). The baseband processor and the CPU may be integrated together or separated from each other. The processor 901 may be configured to implement various functions for the terminal device, for example, is configured to process a communication protocol and communication data, or is configured to: control the entire terminal device, execute a software program, and process data of the software program; or is configured to assist in completing a computing processing task, for example, graphics and image processing or audio processing; or the processor 901 is configured to implement one or more of the foregoing functions.

In addition, the output device 906 communicates with the processor 901, and may display information in a plurality of manners. This is not specifically limited herein.

In a possible implementation, the communication apparatus 90 is configured to perform the method in the embodiment corresponding to FIG. 1. In this case, the transceiver 903 in the communication apparatus 90 is configured to obtain information about a first channel resource of a first cell and information about a second channel resource of a second cell, and the processor 901 then controls the transceiver 903, to communicate with a network side by using the first channel resource of the first cell and/or the second channel resource of the second cell.

The first cell and the second cell are intra-frequency co-coverage cells of each other. Optionally, the first cell and the second cell use a same standard. The information about the first channel resource of the first cell indicates a time-frequency domain position of the channel resource of the first cell, and the information about the second channel resource of the second cell indicates a time-frequency domain position of the channel resource of the second cell. The channel resource (namely, a first channel resource) of the first cell and the channel resource (namely, a second channel resource) of the second cell are arranged within the foregoing first frequency domain range in a time division or frequency division manner, that is, the first channel resource and the second channel resource are arranged in an overlapping part of system bandwidths of the first cell and the second cell in the time division or frequency division manner, so that time-frequency resources are reduced while co-channel interference is avoided.

In a possible implementation, the processor 901 controls the transceiver 903, to communicate with the network side by using the first channel resource of the first cell and the second channel resource of the second cell. If one of the first cell and the second cell is abnormal, the processor 901 controls the transceiver 903, to communicate with the network side by using the channel resource of the other cell of the first cell and the second cell.

In this implementation, the communication apparatus 90 can simultaneously communicate with the network side by using the two intra-frequency co-coverage cells. In addition, when one of the cells is faulty, the communication apparatus 90 can communicate with the network side by using the other cell, and the network side can still provide a service for the communication apparatus 90 by using the normal cell. Therefore, it can be ensured that the service of the communication apparatus 90 is not interrupted.

In a possible implementation, the processor 901 controls the transceiver 903, to communicate with the network side by using the first channel resource of the first cell or the second channel resource of the second cell. If the first cell or the second cell is abnormal, the processor 901 reselects the other cell of the first cell and the second cell, and communicates with the network side by using the channel resource of the reselected cell.

For example, if the processor 901 controls the transceiver 903, to communicate with the network side by using the first channel resource of the first cell, when the first cell is abnormal, because the first cell and the second cell are intra-frequency co-coverage cells, the processor 901 reselects the second cell, to communicate with the network side. For example, if the processor 901 controls the transceiver 903, to communicate with the network side by using the second channel resource of the second cell, when the second cell is abnormal, because the first cell and the second cell are intra-frequency co-coverage cells, the processor 901 reselects the first cell, to communicate with the network side.

In this implementation, the communication apparatus 90 may alternatively access only one of the two intra-frequency co-coverage cells. When the cell accessed by the communication apparatus 90 is faulty, the communication apparatus 90 can quickly reselect the other cell of the two intra-frequency co-coverage cells, to ensure that a service of the communication apparatus 90 is not interrupted or a service of the communication apparatus 90 is only delayed or interrupted for short time.

For other parts, refer to the method performed by the terminal device in the foregoing embodiment. Details are not described herein again.

Figure 10:
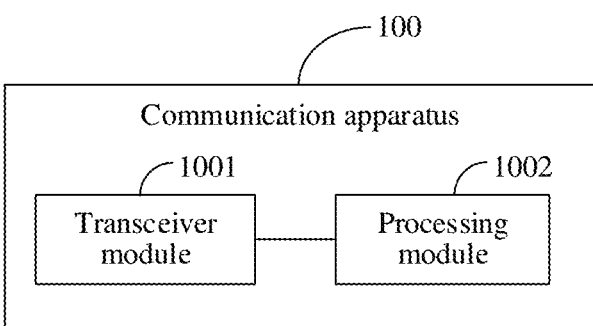
FIG. 10 is a schematic diagram of another embodiment of a communication apparatus according to this application.

As shown in FIG. 10, this application further provides another communication apparatus 100. The communication apparatus 100 may be a network device or a chip in a network device. Optionally, the network device is an access network device. The communication apparatus 100 includes a transceiver module 1001 and a processing module 1002.

Specifically, the processing module 1002 is configured to obtain information about a first channel resource of a first cell. Optionally, the processing module 1002 is configured to obtain information about a second channel resource of a second cell. The processing module 1002 controls the transceiver module 1001, to communicate with a terminal device by using the information about the first channel resource of the first cell and the information about the second channel resource of the second cell.

The first cell and the second cell are intra-frequency co-coverage cells of each other. Optionally, the first cell and the second cell use a same standard. The information about the first channel resource of the first cell indicates a time-frequency domain position of the channel resource of the first cell, and the information about the second channel resource of the second cell indicates a time-frequency domain position of the channel resource of the second cell. The channel resource (namely, a first channel resource) of the first cell and the channel resource (namely, a second channel resource) of the second cell are arranged within the foregoing first frequency domain range in a time division or frequency division manner, that is, the first channel resource and the second channel resource are arranged in an overlapping part of system bandwidths of the first cell and the second cell in the time division or frequency division manner, so that time-frequency resources are reduced while co-channel interference is avoided.

In an optional implementation, the processing module 1002 may first obtain the information about the second channel resource, and then determine the information about the first channel resource based on the information about the second channel resource.

In an optional implementation, the processing module 1002 may further obtain service information of the first cell and service information of the second cell; and determine, based on the service information of the first cell and the service information of the second cell, a quantity of resources occupied by the first data channel resource in frequency domain or a quantity of time domain units occupied by the first data channel resource in time domain. The service information includes service-related information such as a traffic volume and a service priority.

Optionally, the first frequency domain range includes a second frequency domain range, the second frequency domain range is near a center frequency of the first frequency domain range, and the second frequency domain range is less than or equal to the first frequency domain range. The first channel resource includes a first data channel resource, the second channel resource includes a second data channel resource, and the first data channel resource and the second data channel resource are arranged within the second frequency domain range in the time division or frequency division manner.

For other parts, refer to the method performed by the network device in the foregoing embodiment. Details are not described herein again.

Figure 11:
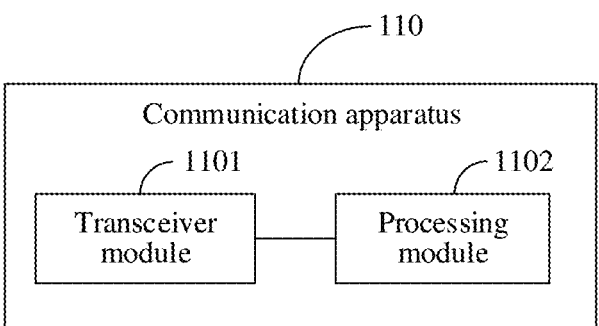
FIG. 11 is a schematic diagram of another embodiment of a communication apparatus according to this application.

As shown in FIG. 11, this application further provides another communication apparatus 110. The communication apparatus 110 may be a terminal device or a chip in a terminal device. The communication apparatus 110 includes a transceiver module 1101 and a processing module 1102.

The transceiver module 1101 in the communication apparatus 110 is configured to obtain information about a first channel resource of a first cell and information about a second channel resource of a second cell, and the processing module 1102 then controls the transceiver module 1101, to communicate with a network side by using the first channel resource of the first cell and/or the second channel resource of the second cell.

The first cell and the second cell are intra-frequency co-coverage cells of each other. Optionally, the first cell and the second cell use a same standard. The information about the first channel resource of the first cell indicates a time-frequency domain position of the channel resource of the first cell, and the information about the second channel resource of the second cell indicates a time-frequency domain position of the channel resource of the second cell. The channel resource (namely, a first channel resource) of the first cell and the channel resource (namely, a second channel resource) of the second cell are arranged within the foregoing first frequency domain range in a time division or frequency division manner, that is, the first channel resource and the second channel resource are arranged in an overlapping part of system bandwidths of the first cell and the second cell in the time division or frequency division manner, so that time-frequency resources are reduced while co-channel interference is avoided.

In a possible implementation, the processing module 1102 controls the transceiver module 1101, to communicate with the network side by using the first channel resource of the first cell and the second channel resource of the second cell. If one of the first cell and the second cell is abnormal, the processing module 1102 controls the transceiver module 1101, to communicate with the network side by using the channel resource of the other cell of the first cell and the second cell.

In this implementation, the communication apparatus 110 can simultaneously communicate with the network side by using the two intra-frequency co-coverage cells. In addition, when one of the cells is faulty, the communication apparatus 110 can communicate with the network side by using the other cell, and the network side can still provide a service for the communication apparatus 110 by using the normal cell. Therefore, it can be ensured that the service of the communication apparatus 110 is not interrupted.

In a possible implementation, the processing module 1102 controls the transceiver module 1101, to communicate with the network side by using the first channel resource of the first cell or the second channel resource of the second cell. If the first cell or the second cell is abnormal, the processing module 1102 reselects the other cell of the first cell and the second cell, and communicates with the network side by using the channel resource of the reselected cell.

For example, if the processing module 1102 controls the transceiver module 1101, to communicate with the network side by using the first channel resource of the first cell, when the first cell is abnormal, because the first cell and the second cell are the intra-frequency co-coverage cells, the processing module 1102 reselects the second cell, to communicate with the network side. For example, if the processing module 1102 controls the transceiver module 1101, to communicate with the network side by using the second channel resource of the second cell, when the second cell is abnormal, because the first cell and the second cell are the intra-frequency co-coverage cells, the processing module 1102 reselects the first cell, to communicate with the network side.

In this implementation, the communication apparatus 110 may alternatively access only one of the two intra-frequency co-coverage cells. When the cell accessed by the communication apparatus 110 is faulty, the communication apparatus 110 can quickly reselect the other cell of the two intra-frequency co-coverage cells, to ensure that a service of the communication apparatus 110 is not interrupted or a service of the communication apparatus 110 is only delayed or interrupted for short time.

For other parts, refer to the method performed by the terminal device in the foregoing embodiment. Details are not described herein again.

During implementation, steps of the foregoing methods may be completed by using a hardware integrated logical circuit in a processor or instructions in a form of software. The steps in the methods disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again. It should be further understood that, "first", "second", "third", "fourth", and various numbers in this specification are merely used for differentiation for ease of description, and are not intended to limit the scope of embodiments of this application.

In addition, this application provides a computer program product. The computer program product includes one or more computer instructions. When the computer program instructions are loaded and executed on a computer, the procedure or functions according to embodiments of this application are all or partially generated. For example, the method related to the network device in FIG. 1 is implemented. For another example, the method related to the terminal device in FIG. 1 is implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

In addition, this application further provides a computer-readable storage medium. The storage medium stores a computer program, and the computer program is executed by a processor to implement the method related to the terminal device in FIG. 1.

In addition, this application further provides a computer-readable storage medium. The storage medium stores a computer program, and the computer program is executed by a processor to implement the method related to the network device in FIG. 1.

It should be understood that the term "and/or" in this specification describes only an association relationship for describing associated objects and indicates that three relationships may exist. For example, A and/or B may represent the following three cases: Only A exists, both A and B exist, and only B exists. In addition, the character "/" in this specification usually indicates an "or" relationship between the associated objects.

It should be understood that in embodiments of this application, sequence numbers of the foregoing processes do not mean an execution sequence. An execution sequence of the processes should be determined based on functions and internal logic of the processes, and should not constitute any limitation on the implementation processes of embodiments of this application.

It may be clearly understood by persons skilled in the art that, for the purpose of convenient and brief description, for detailed working processes of the foregoing system, apparatus, and unit, refer to corresponding processes in the foregoing method embodiments. Details are not described herein again.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions recorded in the foregoing embodiments, or make equivalent replacements to some technical features thereof, without departing from the scope of the technical solutions of embodiments of this application.

What is claimed is:

1. A method, comprising:
obtaining, by a network device, information about a first channel resource of a first cell served by the network device, wherein the first cell and a second cell are intra-frequency co-coverage cells of each other, the first channel resource and a second channel resource of the second cell are arranged within a first frequency domain range in a time division or a frequency division manner, and wherein the first frequency domain range is a frequency domain range in which a frequency domain resource of the first cell overlaps a frequency domain resource of the second cell; and communicating, by the network device, with a terminal device based on the information about the first channel resource and information about the second channel resource.

2. The method according to claim 1, wherein the first cell and the second cell each belong to a different network device.

3. The method according to claim 1, wherein the first cell and the second cell use a same standard.

4. The method according to claim 1, wherein the first cell or the second cell maintains a radio resource control (RRC) connection to the terminal device.

5. The method according to claim 1, wherein the obtaining, by the network device, information about the first channel resource of the first cell served by the network device comprises:

obtaining, by the network device, the information about the second channel resource; and determining, by the network device, the information about the first channel resource based on the information about the second channel resource.

6. The method according to claim 1, further comprising:

obtaining, by the network device, service information of the first cell and service information of the second cell; and determining, by the network device based on the service information of the first cell and the service information of the second cell, a quantity of resources occupied by the first channel resource in a frequency domain or a quantity of time domain units occupied by the first channel resource in a time domain.

7. The method according to claim 1, wherein the first frequency domain range comprises a second frequency domain range, wherein the second frequency domain range is near a center frequency of the first frequency domain range, and wherein the second frequency domain range is less than or equal to the first frequency domain range; and wherein the first channel resource comprises a first data channel resource, the second channel resource comprises a second data channel resource, and wherein the first data channel resource and the second data channel resource are arranged within the second frequency domain range in the time division or frequency division manner.

8. The method according to claim 7, wherein the first channel resource further comprises a first control channel resource, and the second channel resource further comprises a second control channel resource; and wherein the first control channel resource and the second control channel resource are equally arranged within the first frequency domain range in a frequency domain, or the first control channel resource and the second control channel resource are located on two sides outside the second frequency domain range.

9. The method according to claim 8, wherein the first control channel resource and the second control channel resource are equally arranged within the first frequency domain range in the frequency domain, the first control channel resource comprises a resource of a firstthe physical downlink control channel (PDCCH), and the second control channel resource comprises a resource of a second PDCCH; and wherein the first data channel resource comprises a resource of a first physical downlink shared channel (PDSCH), wherein the second data channel resource comprises a resource of a second PDSCH, and wherein the second frequency domain range is equal to the first frequency domain range.

10. The method according to claim 9, wherein the first channel resource further comprises a first common channel resource, the second channel resource further comprises a second common channel resource, the first common channel resource and the resource of the first PDCCH are located on same subcarriers and different symbols, and the second common channel resource and the resource of the second PDCCH are located on same subcarriers and different symbols.

11. A network device, comprising:

at least one processor; and at least one non-transitory computer readable storage medium storing instructions, wherein the at least one non-transitory computer readable storage medium and the instructions are configured, with the at least one processor, to cause the network device to:

obtain information about a first channel resource of a first cell served by the network device, wherein the first cell and a second cell are intra-frequency co-coverage cells of each other, the first channel resource and a second channel resource of the second cell are arranged within a first frequency domain range in a time division or a frequency division manner, and the first frequency domain range is a frequency domain range in which a frequency domain resource of the first cell overlaps a frequency domain resource of the second cell; and communicate with a terminal device based on the information about the first channel resource and information about the second channel resource.

12. The network device according to claim 11, wherein the first cell and the second cell each belong to a different network device.

13. A terminal device, comprising:

at least one processor; and at least one non-transitory computer readable storage medium storing instructions, wherein the at least one non-transitory computer readable storage medium and the instructions are configured, with the at least one processor, to cause the terminal device to:

obtain information about a first channel resource of a first cell and information about a second channel resource of a second cell; and communicate with a network side by using the first channel resource of the first cell and the second channel resource of the second cell, wherein the first cell and the second cell are intra-frequency co-coverage cells of each other, the first channel resource and the second channel resource are arranged within a first frequency domain range in a time division or frequency division manner, and the first frequency domain range is a frequency domain range in which a frequency domain resource of the first cell overlaps a frequency domain resource of the second cell.

14. The terminal device according to claim 13, wherein the first cell and the second cell each belong to a different network device.

15. The terminal device according to claim 13, wherein the first cell and the second cell use a same standard.

16. The terminal device according to claim 13, wherein the first cell or the second cell maintains a radio resource control (RRC) connection to the terminal device.

17. The terminal device according to claim 13, wherein a quantity of resources occupied by the first channel resource in a frequency domain is determined based on service information of the first cell and service information of the second cell; or a quantity of time domain units occupied by the second channel resource in a time domain is determined based on the service information of the first cell and the service information of the second cell.

18. The terminal device according to claim 13, wherein the first frequency domain range comprises a second frequency domain range, the second frequency domain range is near a center frequency of the first frequency domain range, and the second frequency domain range is less than or equal to the first frequency domain range; and wherein the first channel resource comprises a first data channel resource, the second channel resource comprises a second data channel resource, and wherein the first data channel resource and the second data channel resource are arranged within the second frequency domain range in the time division or frequency division manner.

19. The terminal device according to claim 18, wherein the first channel resource further comprises a first control channel resource, and wherein the second channel resource further comprises a second control channel resource; and wherein the first control channel resource and the second control channel resource are equally arranged within the first frequency domain range in a frequency domain, or the first control channel resource and the second control channel resource are located on two sides outside the second frequency domain range.

20. The terminal device according to claim 19, wherein when the first control channel resource and the second control channel resource are equally arranged within the first frequency domain range in the frequency domain, wherein the first control channel resource comprises a resource of a first physical downlink control channel (PDCCH), and the second control channel resource comprises a resource of a second PDCCH; and wherein the first data channel resource comprises a resource of a first physical downlink shared channel (PDSCH), the second data channel resource comprises a resource of a second PDSCH, and the second frequency domain range is equal to the first frequency domain range.

\* \* \* \* \*